(12) United States Patent
Onuki

(10) Patent No.: US 7,920,781 B2
(45) Date of Patent: Apr. 5, 2011

(54) IMAGE CAPTURING APPARATUS AND CONTROL METHOD THEREFOR

(75) Inventor: Ichiro Onuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 12/141,575

(22) Filed: Jun. 18, 2008

(65) Prior Publication Data

US 2008/0317454 A1    Dec. 25, 2008

(30) Foreign Application Priority Data

Jun. 20, 2007  (JP) ................................. 2007-163019

(51) Int. Cl.
G03B 13/34 (2006.01)
(52) U.S. Cl. ....................................... 396/121; 348/294
(58) Field of Classification Search .................. 396/121; 348/230.1, 236, 237, 281, 221.1
See application file for complete search history.

(56) References Cited

U.S. PATENT DOCUMENTS

| | | | |
|---|---|---|---|
| 6,819,360 B1 * | 11/2004 | Ide et al. ........................ | 348/340 |
| 7,193,197 B2 * | 3/2007 | Sugiyama et al. ........... | 250/208.1 |
| 2001/0008422 A1 * | 7/2001 | Mizuno et al. ................ | 348/302 |
| 2007/0206940 A1 * | 9/2007 | Kusaka ......................... | 396/128 |
| 2008/0128598 A1 * | 6/2008 | Kanai et al. ................... | 250/226 |
| 2008/0158343 A1 * | 7/2008 | Schechterman et al. ........ | 348/45 |
| 2009/0002505 A1 * | 1/2009 | Imada ......................... | 348/218.1 |
| 2010/0238340 A1 * | 9/2010 | Hamasaki ..................... | 348/311 |

FOREIGN PATENT DOCUMENTS

| | | |
|---|---|---|
| JP | 09-046596 | 2/1997 |
| JP | 2000-156823 | 6/2000 |
| JP | 2000-292686 | 10/2000 |
| JP | 2001-305415 | 10/2001 |
| JP | 2003-153291 | 5/2003 |
| JP | 2003-156677 | 5/2003 |

* cited by examiner

Primary Examiner — W. B. Perkey
Assistant Examiner — Linda B Smith
(74) Attorney, Agent, or Firm — Cowan, Liebowitz & Latman, P.C.

(57) ABSTRACT

An image capturing apparatus includes an image sensor, composition unit, coupling unit, and arithmetic unit. The image sensor has a plurality of pupil-divided focus detection portions each formed from a first focus detection pixel and second focus detection pixel. The composition unit composites signals output from the first focus detection pixels to obtain a first composite signal, and composites signals output from the second focus detection pixels to obtain a second composite signal in each of sections assigned to the image sensor to include a plurality of focus detection portions. The coupling unit couples first composite signals to obtain a first coupled signal, and couples second composite signals to obtain a second coupled signal in the plurality of sections. The arithmetic unit calculates the defocus amount of an image forming optical system on the basis of the first and second coupled signals.

7 Claims, 30 Drawing Sheets

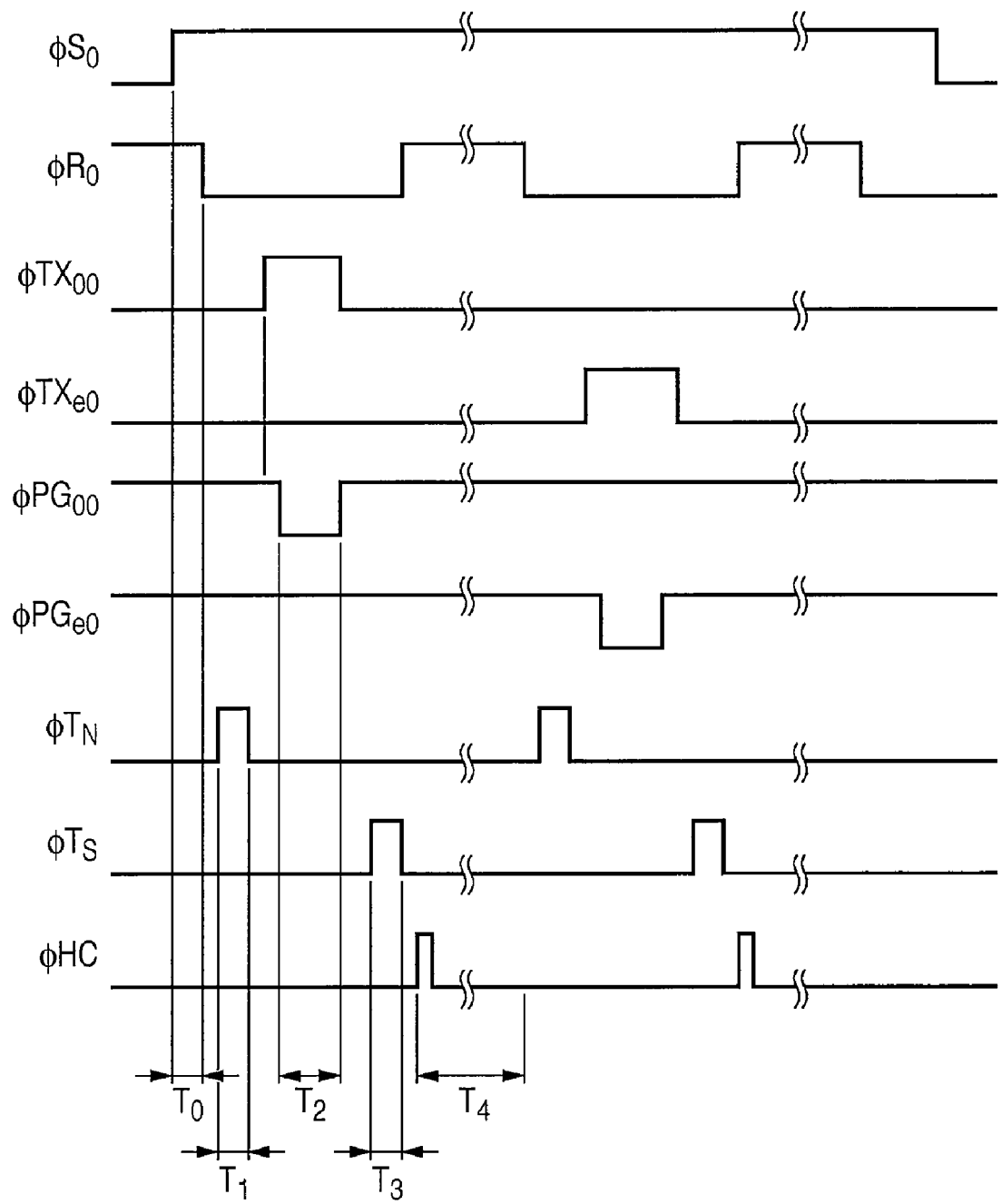

PLAN VIEW

SECTIONAL VIEW ALONG A - A

FIG. 6B
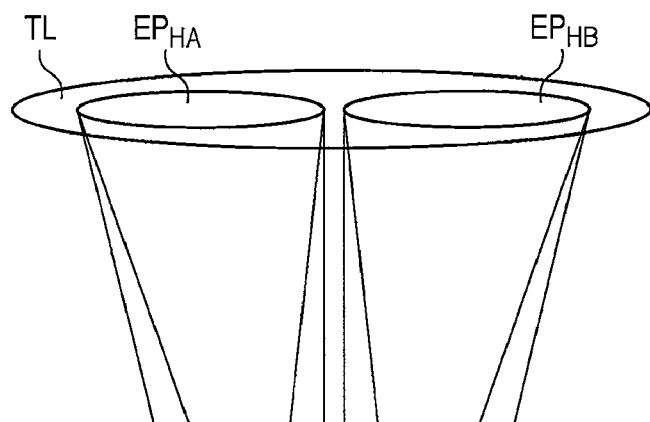
FIG. 6A
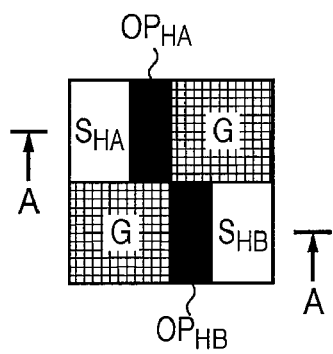
PLAN VIEW
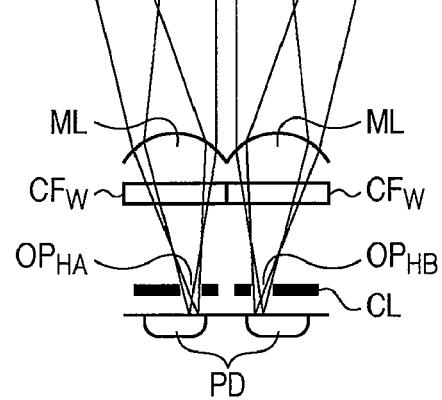
SECTIONAL VIEW ALONG A - A

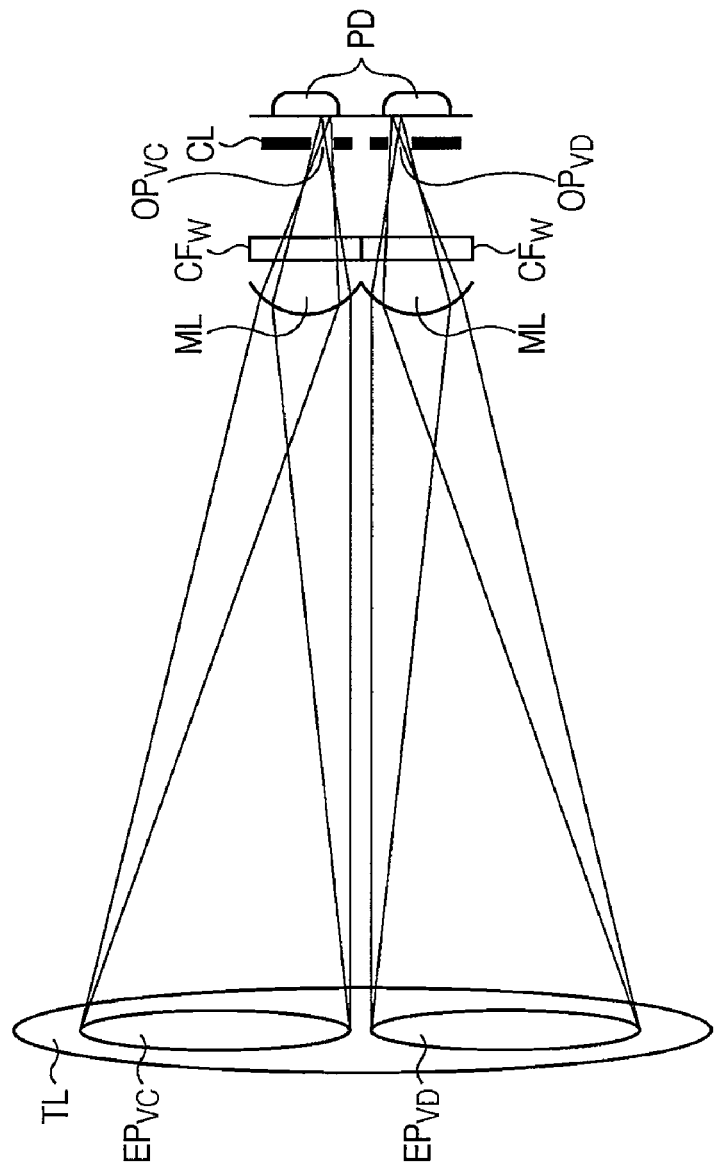
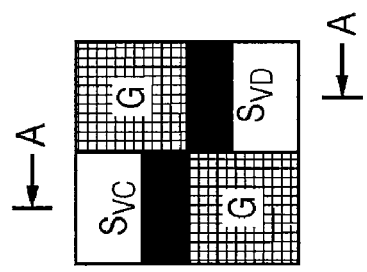

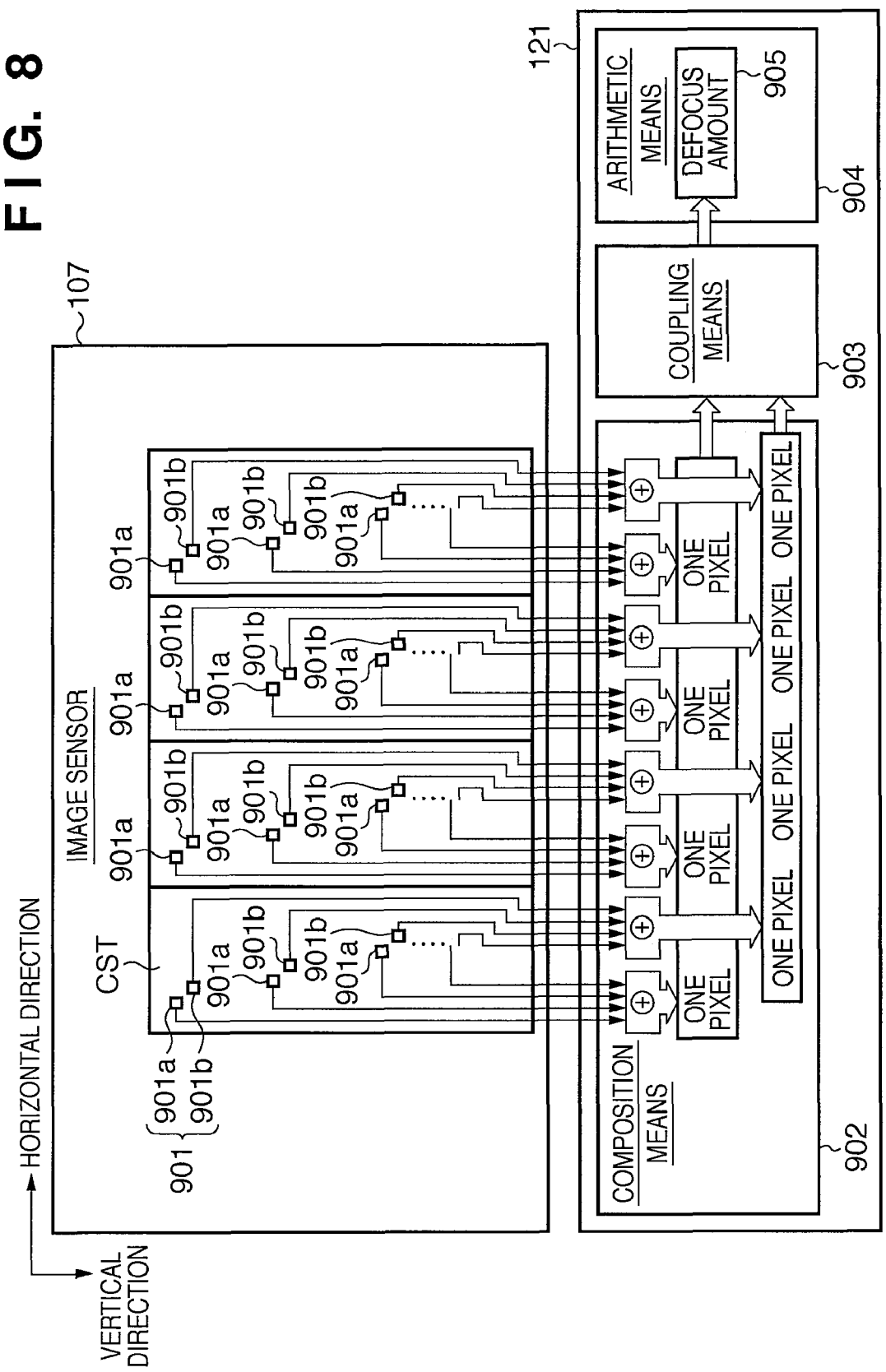

PROJECTION CHARACTERISTIC

THIN LINE CAPTURING CAPABILITY

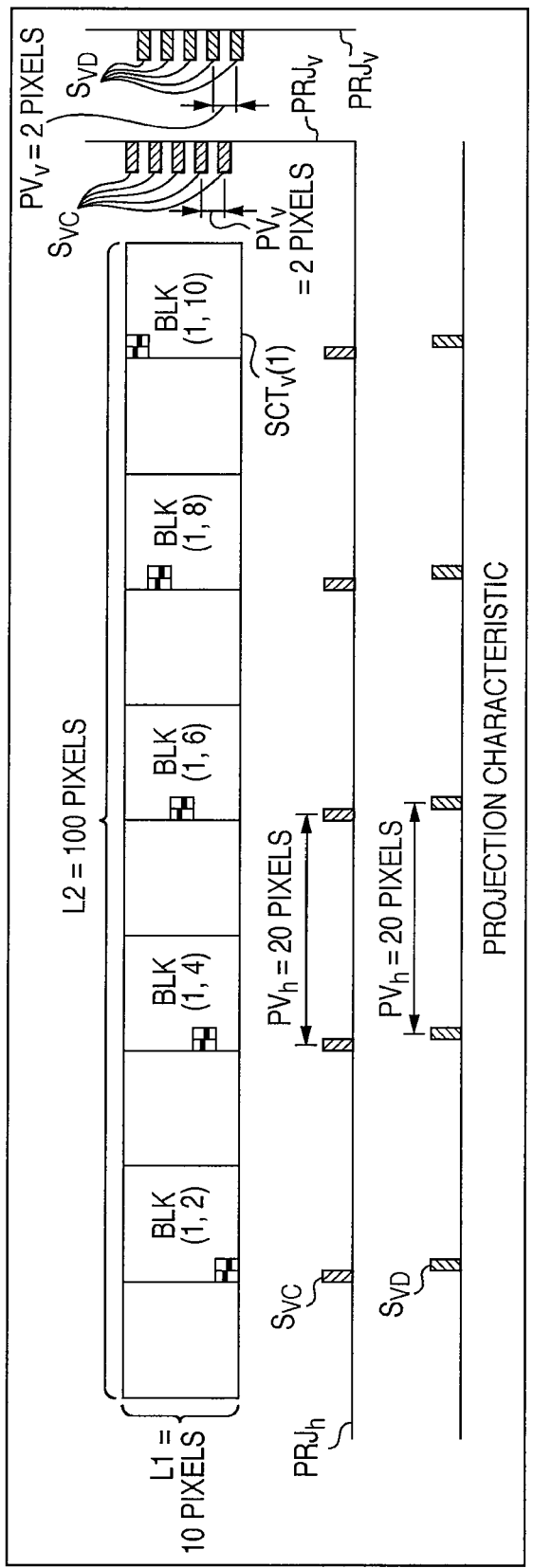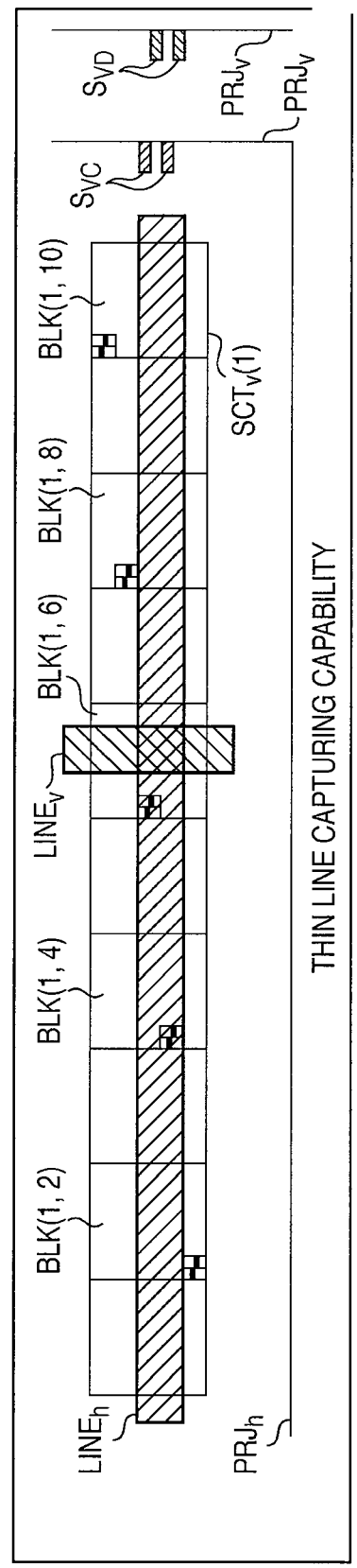

FIG. 22

PROJECTION CHARACTERISTIC

THIN LINE CAPTURING CAPABILITY

IMAGE CAPTURING APPARATUS AND CONTROL METHOD THEREFOR

BACKGROUND OF THE INVENTION

1. Field of the Invention

The present invention relates to an image capturing apparatus using an image sensor capable of capturing at least either a still image or moving image by two-dimensionally arrayed photoelectric conversion elements, and a control method therefor.

2. Description of the Related Art

A contrast detection method (called a blur detection method) and a phase-difference detection method (called a defocus detection method) have been proposed as general methods using a beam having passed through a photographing optical system in automatic focus detection/adjustment of an image capturing apparatus.

The contrast detection method is often used in a video movie camera (camcorder) for recording a moving image, and an electronic still camera. The image sensor is used as a focus detection sensor. This method pays attention to the output signal of the image sensor, especially information (contrast information) of a high-frequency component, and a position of the photographing optical system where the evaluation value maximizes is set as an in-focus position. However, the contrast detection method, also called a hill-climbing detection method, is not suitable for a high-speed focus adjustment operation because the evaluation value is obtained while slightly moving the photographing optical system, and the photographing optical system needs to be moved until it is revealed that the evaluation value was maximum.

The phase-difference detection method is generally adopted in single-lens reflex cameras using a silver halide film, and is a technique most contributed to practical use of an AF (Auto Focus) single-lens reflex camera. According to the phase-difference detection method, a beam having passed through the exit pupil of the photographing optical system is split into two, and the two beams are received by a pair of focus detection sensors. The defocus amount of the photographing optical system in the focusing direction is directly obtained by detecting the difference between signals output in accordance with the light reception amounts, i.e., the relative positional shift amount in the direction in which the beam is split. Once the focus detection sensor executes the accumulation operation, the defocus amount and direction can be attained to perform a high-speed focus adjustment operation. To split a beam having passed through the exit pupil of the photographing optical system into two, and obtain signals corresponding to the two beams, an optical path division means such as a quick return mirror or half-mirror is generally inserted in the image sensing optical path, and a focus detection optical system and AF sensor are arranged on the output side of the optical path division means. This structure makes the device bulky and expensive.

To solve this disadvantage, there is also disclosed a technique of adding a phase-difference detection function to an image sensor to eliminate a dedicated AF sensor and implement high-speed phase difference AF.

For example, in Japanese Patent Laid-Open No. 2000-156823, the pupil division function is added to some light receiving elements (pixels) of an image sensor by decentering the sensitive areas of their light receiving portions from the optical axis of an on-chip microlens. These pixels are used as focus detection pixels, and arranged between image sensing pixels at predetermined intervals to perform phase-difference focus detection. Since no image sensing pixel exists at portions where focus detection pixels are arranged, image information is generated by interpolation using information of peripheral image sensing pixels.

In Japanese Patent Laid-Open No. 2000-292686, the pupil division function is implemented by dividing each of the light receiving portions of some pixels of an image sensor into two, right and left, or upper and lower portions. These pixels are used as focus detection pixels (focus detection portions), and arranged between image sensing pixels at predetermined intervals to perform phase-difference focus detection. Even according to this technique, no image sensing pixel exists at portions where focus detection pixels are arranged, so image information is generated by interpolation using information of peripheral image sensing pixels.

In Japanese Patent Laid-Open No. 2001-305415, the pupil division function is provided by dividing each of the light receiving portions of some pixels of an image sensor into two, upper and lower portions. Outputs from the two divided light receiving portions are individually processed to execute phase-difference focus detection for an object having a luminance distribution in the vertical direction. This reference also discloses a technique of adding outputs from the two divided light receiving portions for use for an image sensing signal, and detecting the contrast between pixels adjacent to each other in the horizontal direction to perform contrast focus detection for an object having a luminance distribution in the horizontal direction.

Japanese Patent Laid-Open No. 2003-153291 discloses a technique of performing phase-difference focus detection for an object having luminance distributions in the horizontal and vertical directions. In this reference, focus detection elements whose light receiving portions are divided into right and left, or upper and lower portions are repetitively arranged every other line of an image sensor.

However, according to any of these references, luminance corresponding to each focus detection portion is too low to reliably detect the luminance distribution of an object. It is, therefore, difficult to perform accurate focus detection.

SUMMARY OF THE INVENTION

The present invention has been made to overcome the conventional drawbacks, and has as its object to improve the detection capability of a focus detection portion and perform more accurate focus detection.

According to the first aspect of the present invention, there is provided an image capturing apparatus comprising an image sensor having a plurality of pupil-divided focus detection portions each formed from a first focus detection pixel and a second focus detection pixel, a composition unit which composites signals output from the first focus detection pixels to obtain a first composite signal, and composites signals output from the second focus detection pixels to obtain a second composite signal in each of a plurality of sections assigned to the image sensor to include a plurality of focus detection portions, a coupling unit which couples first composite signals to obtain a first coupled signal, and couples second composite signals to obtain a second coupled signal in the plurality of sections, and an arithmetic unit which calculates a defocus amount of an image forming optical system on the basis of the first coupled signal and the second coupled signal.

According to the second aspect of the present invention, there is provided a method of controlling an image capturing apparatus having an image sensor with a plurality of pupil-divided focus detection portions each formed from a first focus detection pixel and a second focus detection pixel, the method comprising steps of assigning, to the image sensor, a plurality of sections each including a plurality of focus detection portions, compositing signals output from the first focus detection pixels to obtain a first composite signal in each of the plurality of sections, compositing signals output from the second focus detection pixels to obtain a second composite signal in each of the plurality of sections, coupling first composite signals to obtain a first coupled signal in the plurality of sections, coupling second composite signals to obtain a second coupled signal in the plurality of sections, and calculating a defocus amount of an image forming optical system on the basis of the first coupled signal and the second coupled signal.

Further features of the present invention will become apparent from the following description of exemplary embodiments with reference to the attached drawings.

BRIEF DESCRIPTION OF THE DRAWINGS

FIG. 4 is a driving timing chart of the image sensor according to the preferred embodiment of the present invention;

FIGS. 6A and 6B are a plan view and sectional view, respectively, showing a focus detection pixel of the image sensor according to the preferred embodiment of the present invention;

FIGS. 7A and 7B are a plan view and sectional view, respectively, showing another focus detection pixel of the image sensor according to the preferred embodiment of the present invention;

FIG. 8 is a view for explaining the concept of focus detection according to the preferred embodiment of the present invention;

FIGS. 15A and 15B are views for explaining an image sampling characteristic in longitudinal defocus detection according to the first preferred embodiment of the present invention;

FIG. 22 is a view for explaining a pixel array of the image sensor for a superordinate unit according to the second preferred embodiment of the present invention;

DESCRIPTION OF THE EMBODIMENTS

An image capturing apparatus and control method therefor according to preferred embodiments of the present invention will be described in detail below with reference to the accompanying drawings.

First Embodiment

FIGS. 1 to 20 are views for explaining an image capturing apparatus and control method therefor according to the embodiment of the present invention. The operation of the embodiment will be described with reference to these drawings.

Figure 1:
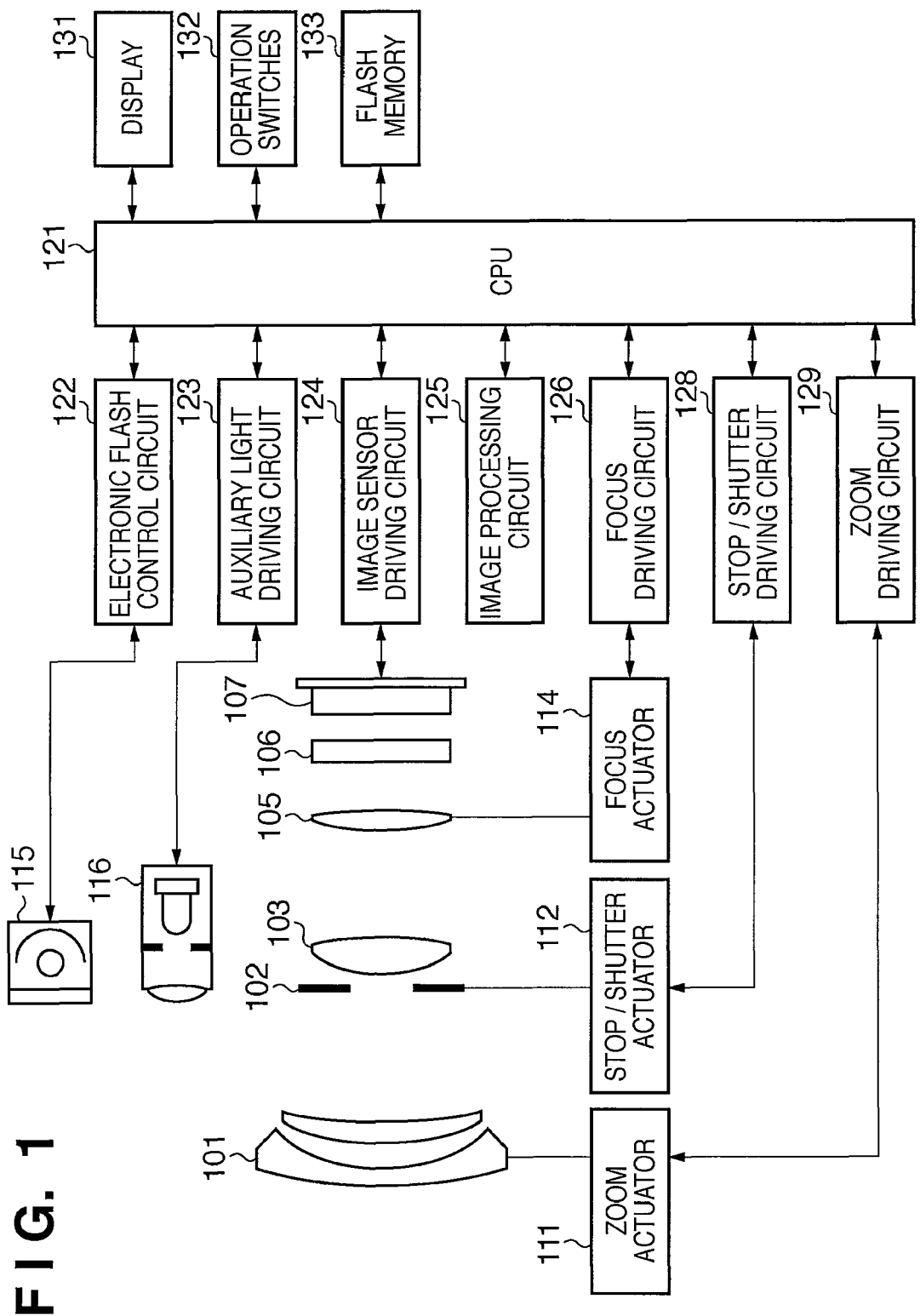
FIG. 1 is a view of the configuration of an image capturing apparatus according to a preferred embodiment of the present invention.

FIG. 1 is a view of the configuration of the image capturing apparatus according to the preferred embodiment of the present invention. FIG. 1 shows an electronic camera configured by integrating a camera body having an image sensor with a photographing optical system. In FIG. 1, a first lens group 101 is arranged on the first stage of the photographing optical system (image forming optical system), and is held reciprocally along the optical axis. A stop/shutter 102 adjusts the aperture diameter to adjust the light quantity in shooting.

The stop/shutter 102 also functions as a shutter for adjusting the exposure time when shooting a still image. The stop/shutter 102 and a second lens group 103 reciprocate together along the optical axis to achieve a zooming operation (zooming function) in synchronism with the reciprocal operation of the first lens group 101.

A third lens group 105 reciprocates along the optical axis to adjust the focus. An optical low-pass filter 106 is an optical element for reducing the false color and moire of a shot image. An image sensor 107 includes a CMOS image sensor and its peripheral circuit. The image sensor is a two-dimensional 1CCD color sensor in which a primary color mosaic filter with the Bayer array is formed on a chip.

By pivoting a cam cylinder (not shown), a zoom actuator 111 drives the first lens group 101 to third lens group 105 to reciprocate along the optical axis and perform the zooming operation. A stop/shutter actuator 112 controls the aperture diameter of the stop/shutter 102 to adjust the light quantity in shooting, and controls the exposure time when sensing a still image. A focus actuator 114 drives the third lens group 105 to reciprocate along the optical axis and adjust the focus.

An electronic flash 115 is used to illuminate an object in shooting. The electronic flash 115 is preferably a flash illumination device using a xenon tube, but may also be an illumination device having a continuous emission LED. An AF auxiliary light means 116 projects, to the field via a projection lens, an image of a mask having a predetermined aperture pattern, and improves the focus detection capability for a dark object or low-contrast object.

A CPU 121 executes various control operations of the camera body in the image capturing apparatus. The CPU 121 comprises, e.g., an arithmetic unit, ROM, RAM, A/D converter, D/A converter, communication interface circuit, and the like. Based on a predetermined program stored in the ROM, the CPU 121 drives various circuits of the image capturing apparatus to execute a series of operations including AF, shooting, image processing, and recording.

An electronic flash control circuit 122 controls the ON operation of the electronic flash 115 in synchronism with the shooting operation. An auxiliary light driving circuit 123 controls the ON operation of the AF auxiliary light means 116 in synchronism with the focus detection operation. An image sensor driving circuit 124 controls the image sensing operation of the image sensor 107, A/D-converts an acquired image signal, and transmits the digital data to the CPU 121. An image processing circuit 125 performs processes such as γ conversion, color interpolation, and JPEG compression for an image obtained by the image sensor 107.

A focus driving circuit 126 controls to drive the focus actuator 114 on the basis of the focus detection result, and drives the third lens group 105 to reciprocate along the optical axis, thereby adjusting the focus. A stop/shutter driving circuit 128 controls to drive the stop/shutter actuator 112, thereby controlling its aperture. A zoom driving circuit 129 drives the zoom actuator 111 in accordance with the zooming operation of the user.

A display 131 is, e.g., an LCD, and displays information on the shooting mode of the image capturing apparatus, a preview image before shooting, a confirmation image after shooting, an in-focus display image upon focus detection, and the like. Operation switches 132 include a power switch, release (shooting trigger) switch, zooming operation switch, shooting mode selection switch, and the like. A detachable flash memory 133 records a shot image.

Figure 2:
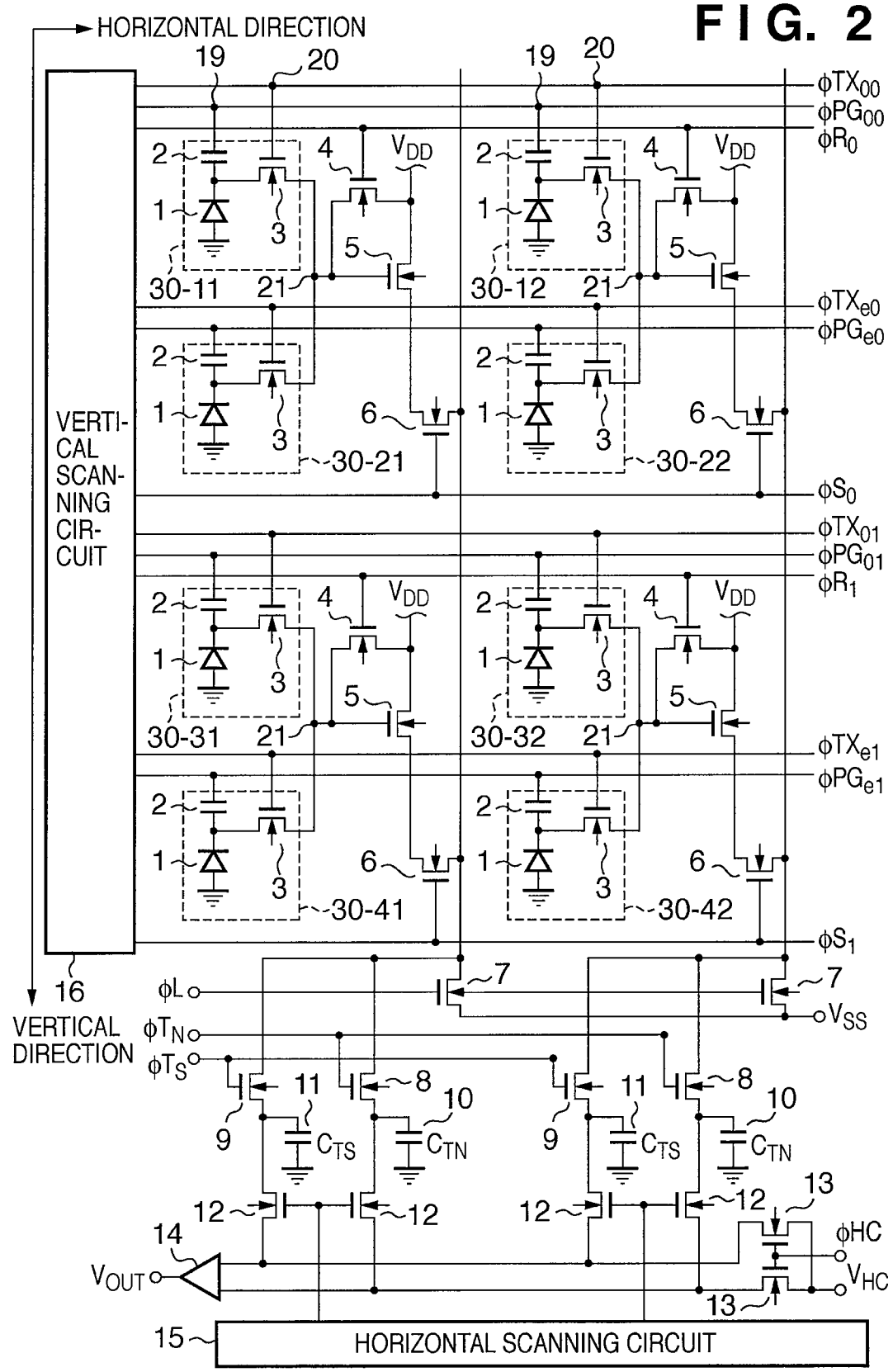
FIG. 2 is a circuit diagram of an image sensor according to the preferred embodiment of the present invention.

FIG. 2 is a schematic circuit diagram of the image sensor according to the preferred embodiment of the present invention. The image sensor can be manufactured according to a technique disclosed in, e.g., Japanese Patent Laid-Open No. 09-046596 filed by the present inventor. FIG. 2 shows a pixel area of 2 columns×4 rows in an area sensor on which CMOS image sensors are two-dimensionally arrayed. When the area sensor is used as an image sensor, a plurality of pixel areas shown in FIG. 2 are arranged to obtain a high-resolution image. The embodiment will exemplify a digital still camera image sensor having a pixel pitch of 2 μm, effective pixels on 3,000 columns×2,000 rows=6,000,000 pixels, and an image sensing frame size of 6 mm in width×4 mm in length.

In FIG. 2, reference numeral 1 denotes a photoelectric conversion element formed from a transistor; 2, a photogate; and 3, a transfer switch transistor. The photoelectric conversion element 1, photogate 2, and transfer switch transistor 3 form one of pixels 30-11 to 30-32. Reference numeral 4 denotes a reset transistor; 5, a source follower amplifier transistor; 6, a horizontal selection switch transistor; and 7, a load transistor for the source follower. Reference numeral 8 denotes a dark output transfer transistor; 9, a bright output transfer transistor; 10, a dark output accumulation capacitor $C_{TN}$; 11, a bright output accumulation capacitor $C_{TS}$; and 12, a horizontal transfer transistor. Reference numeral 13 denotes a horizontal output line reset transistor; 14, a differential output amplifier; 15, a horizontal scanning circuit; and 16, a vertical scanning circuit. Each transistor shown in FIG. 2 is, e.g., a MOS transistor.

Figure 3:
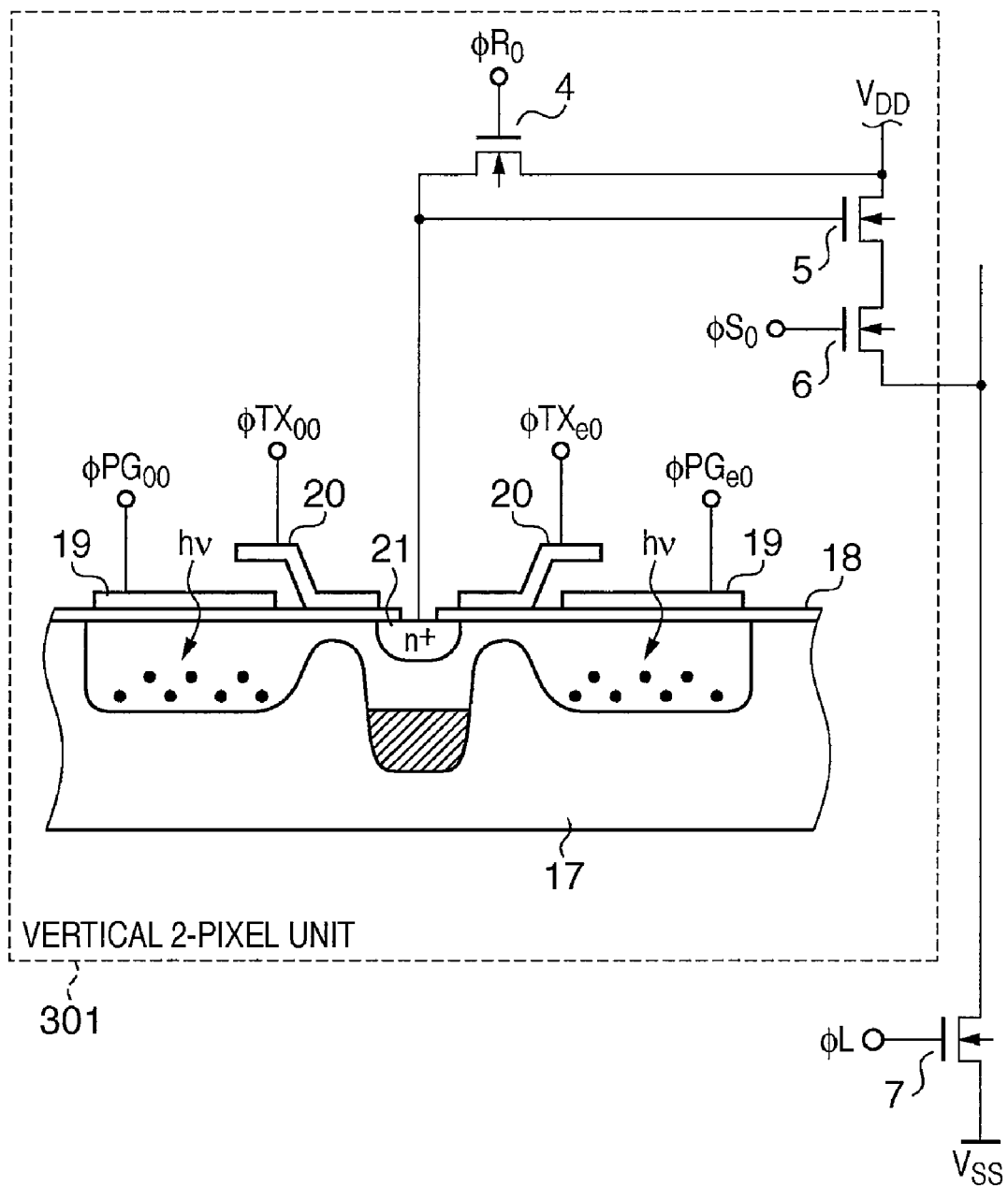
FIG. 3 is a sectional view of the pixel of the image sensor according to the preferred embodiment of the present invention.

FIG. 3 is a sectional view of a unit made up of two pixels. A unit 301 in FIG. 3 is exemplarily made up of the pixels 30-11 and 30-21 in FIG. 2. In FIG. 3, reference numeral 17 denotes a P-well; 18, a gate insulating film formed from an oxide film or the like; 19, a first poly-Si layer; 20, a second poly-Si layer; and 21, an n$^+$-floating diffusion (FD). The FD 21 is connected to another photoelectric conversion element via another transfer transistor. In FIG. 3, the drain of two transfer switch transistors 3 and the FD 21 are shared to increase the sensitivity by micropatterning and reduction in the capacity of the FD 21. The FD 21 may also be connected by, e.g., an Al wire.

The operation will be explained with reference to the timing chart of FIG. 4. This timing chart shows the case of independently outputting signals from all pixels. In FIG. 4, the abscissa axis represents the time, and the ordinate axis represents the signal waveform of each signal.

In response to a timing output from the vertical scanning circuit 16, a control pulse φL changes to high level to reset a vertical output line. Control pulses $\phi R_0$, $\phi PG_{00}$, and $\phi PG_{e0}$ change to high level to turn on the reset transistor 4 and set the first poly-Si layer 19 of the photogate 2 to high level. In the period $T_0$, a control pulse $\phi S_0$ changes to high level to turn on the selection switch transistor 6 and select pixels on the first and second lines. Then, the control pulse $\phi R_0$ changes to low level to stop resetting the FD 21 and sets it to the floating state. Charges accumulated in the FD 21 are read out as a change of the voltage from the source of the source follower amplifier transistor 5 via the gate. In the period $T_1$, a control pulse $\phi T_N$ changes to high level to output a dark voltage from the FD 21 to the accumulation capacitor $C_{TN}$ 10 by the source follower operation.

To photoelectrically convert outputs from pixels on the first line, a control pulse $\phi TX_{00}$ for the first line changes to high level to turn on the transfer switch transistor 3. In the period $T_2$, the control pulse $\phi PG_{00}$ changes to low level. The voltage relationship preferably raises the potential well spreading below the photogate 2 to completely transfer photoinduced carriers to the FD 21. Hence, the control pulse φTX may also be a fixed potential instead of a pulse as long as carriers can be completely transferred.

In the period $T_2$, when charges are transferred from the photoelectric conversion element 1 of the photodiode to the FD 21, the potential of the FD 21 changes depending on light. Since the source follower amplifier transistor 5 is in the floating state, the potential of the FD 21 is output to the accumulation capacitor $C_{TS}$ 11 by changing a control pulse $\phi T_S$ to high level in the period $T_3$. Up to this time, dark and bright outputs from pixels on the first line have been accumulated in the accumulation capacitors $C_{TN}$ 10 and $C_{TS}$ 11, respectively. In the period $T_4$, a control pulse $\phi HC$ temporarily changes to high level to turn on the horizontal output line reset transistors 13 and reset the horizontal output lines. In the horizontal transfer period, dark and bright outputs from pixels are output to the horizontal output lines in response to the scanning timing signal of the horizontal scanning circuit 15. At this time, the differential output amplifier 14 outputs a differential output $V_{OUT}$ between the accumulation capacitors $C_{TN}$ 10 and $C_{TS}$ 11, obtaining a signal with high S/N ratio free from random noise and fixed-pattern noise of the pixel. Photocharges in the pixels 30-12 and 30-22 are respectively accumulated in the accumulation capacitors $C_{TN}$ 10 and $C_{TS}$ 11 at the same time as those in the pixels 30-11 and 30-21. In this readout, however, the timing pulse from the horizontal scanning circuit 15 is delayed by one pixel, and then photocharges are read out to the horizontal output lines and output from the differential output amplifier 14.

In the embodiment, the differential output $V_{OUT}$ is obtained within the chip. However, the same effects can also be attained using a conventional CDS (Correlated Double Sampling) circuit arranged outside the chip, in place of obtaining the differential output $V_{OUT}$ within the chip.

After outputting a bright output to the accumulation capacitor $C_{TS}$ 11, the control pulse $\phi R_0$ changes to high level to turn on the reset transistor 4 and reset the FD 21 to the power supply $V_{DD}$. After the end of horizontal transfer from the first line, photocharges are read out from the second line. In the readout from the second line, the control pulses $\phi TX_{e0}$ and $\phi PG_{e0}$ are similarly driven and the high-level control pulses $\phi T_N$ and $\phi T_S$ are supplied to accumulate photocharges in the accumulation capacitors $C_{TN}$ 10 and $C_{TS}$ 11, and output dark and bright outputs. By this driving, photocharges can be independently read out from the first and second lines. Then, the vertical scanning circuit is driven to read out photocharges from the (2n+1)th and (2n+2)th lines (n=1, 2, . . . ), thereby independently outputting photocharges from all pixels. For example, for n=1, the control pulse $\phi S_1$ changes to high level, and then $\phi R_1$ changes to low level. The control pulses $\phi T_N$ and $\phi TX_{01}$ change to high level, the control pulse $\phi PG_{01}$ changes to low level, the control pulse $\phi T_S$ changes to high level, and the control pulse $\phi HC$ temporarily changes to high level, reading out pixel signals from the pixels 30-31 and 30-32. Subsequently, the control pulses $\phi TX_{e1}$ and $\phi PG_{e1}$ are applied in the above-described way, reading out pixel signals from the pixels 30-41 and 30-42.

FIGS. 5A to 7B are views for explaining the structures of an image sensing pixel and focus detection pixel. The preferred embodiment of the present invention adopts a Bayer array in which two pixels having G (Green) spectral sensitivity are diagonally arranged among 2×2=four pixels, and pixels each having R (Red) or B (Blue) spectral sensitivity are arranged as the remaining two pixels. Focus detection pixels with a structure (to be described later) are distributed and arranged between pixels of the Bayer array in accordance with a predetermined rule.

Figure 5B:
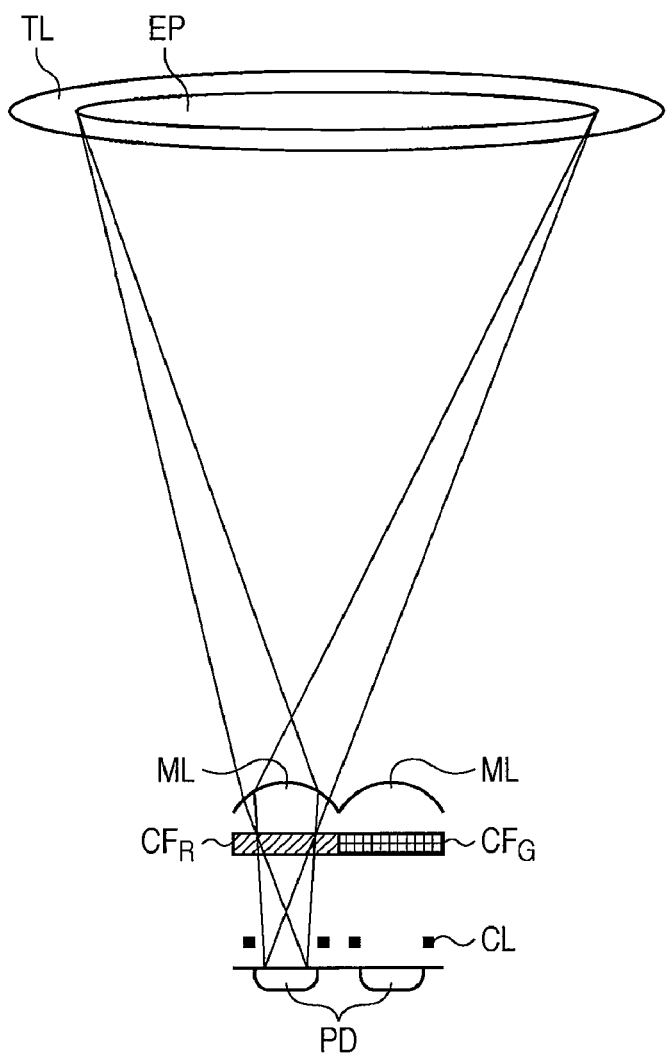
FIGS. 5A and 5B are a plan view and sectional view, respectively, showing the image sensing pixel of the image sensor according to the preferred embodiment of the present invention.
Figure 5A:
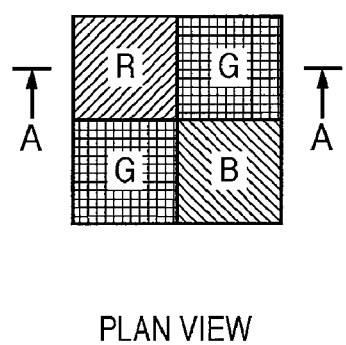

FIGS. 5A and 5B show the arrangement and structure of image sensing pixels. FIG. 5A is a plan view of 2×2 image sensing pixels. As is generally known, in the Bayer array, G pixels are diagonally arranged, and R and B pixels are arranged as the two remaining pixels. This 2×2 structure is repetitively arranged.

FIG. 5B is a sectional view taken along the line A-A in FIG. 5A. Reference symbol ML denotes an on-chip microlens arranged in front of each pixel; CFR, an R (Red) color filter; and $CF_G$, a G (Green) color filter. Reference symbol PD (Photo Diode) denotes a schematic photoelectric conversion element of the CMOS image sensor shown in FIG. 3. Reference symbol CL (Contact Layer) denotes an interconnection layer for forming a signal line for transmitting various signals within the CMOS image sensor. Reference symbol TL (Taking Lens) denotes a schematic photographing optical system.

The on-chip microlens ML and photoelectric conversion element PD of the image sensing pixel are configured to capture a beam having passed through the photographing optical system TL as effectively as possible. In other words, an exit pupil EP (Exit Pupil) of the photographing optical system TL and the photoelectric conversion element PD are conjugate to each other via the microlens ML, and the effective area of the photoelectric conversion element is designed large. FIG. 5B shows the incident beam of the R pixel, but the G pixel and B (Blue) pixel also have the same structure. The exit pupil EP corresponding to each of R, G, and B image sensing pixels has a large diameter, and a beam (light quantum) from an object can be efficiently captured to increase the S/N ratio of an image signal.

FIGS. 6A and 6B show the arrangement and structure of focus detection pixels for dividing the pupil in the horizontal direction (lateral direction) of the photographing optical system. The horizontal direction or lateral direction is a direction along a straight line which is perpendicular to the optical axis and extends in the horizontal direction when the user holds the image capturing apparatus so that the optical axis of the photographing optical system and the long side of the photographing frame become parallel to the ground. The pupil division direction in FIGS. 6A and 6B is the horizontal direction. FIG. 6A is a plan view of 2×2 pixels including focus detection pixels. When obtaining an image signal for recording or viewing, the main component of luminance information is attained by a G pixel. The image recognition feature of a man is sensitive to luminance information. Thus, if a G pixel is damaged, degradation of the image quality is readily perceived. An R or B pixel is used to acquire color information (color difference information), and the visual feature of a man is not sensitive to color information. Hence, even if a pixel for acquiring color information is slightly damaged, degradation of the image quality is hardly recognized. From this, in the embodiment, G pixels out of 2×2 pixels are left as image sensing pixels, and R and B pixels are replaced with focus detection pixels. In FIG. 6B, $S_{HA}$ and $S_{HB}$ represent focus detection pixels.

FIG. 6B is a sectional view taken along the line A-A in FIG. 6A. The microlens ML and photoelectric conversion element PD have the same structures as those of the image sensing pixel shown in FIG. 5B. In the embodiment, a signal from the focus detection pixel is not used to generate an image, so a transparent film (CFW) (white) is arranged in place of the color filter for separating color. To divide the pupil by the image sensor, the aperture of the interconnection layer CL deviates in one direction from the center line of the microlens ML. More specifically, an aperture $OP_{HA}$ of the pixel $S_{HA}$ deviates to the right and receives a beam having passed through a left exit pupil $EP_{HA}$ of the photographing optical system TL. Similarly, an aperture $OP_{HB}$ of the pixel $S_{HB}$ deviates to the left and receives a beam having passed through a right exit pupil $EP_{HA}$ of the photographing optical system TL. Pixels $S_{HA}$ are arrayed regularly in the horizontal direction, and an object image obtained by these pixels is defined as image A. Pixels $S_{HB}$ are also arrayed regularly in the horizontal direction, and an object image obtained by these pixels is defined as image B. By detecting the relative positions of the images A and B, the defocus amount of the object image can be detected.

The pixels $S_{HA}$ and $S_{HB}$ can detect the focus of an object, e.g., a vertical line having a luminance distribution in the lateral direction of the photographing frame, but cannot detect the focus of a horizontal line having a luminance distribution in the longitudinal direction. Thus, the embodiment adopts a pixel for dividing the pupil even in the vertical direction (longitudinal direction) of the photographing optical system so as to detect even the focus of a horizontal line.

FIGS. 7A and 7B show the arrangement and structure of focus detection pixels for dividing the pupil in the vertical direction (top-to-bottom direction or longitudinal direction) of the photographing optical system. The vertical direction, top-to-bottom direction, or longitudinal direction is a direction along a straight line which is perpendicular to the optical axis and extends in the vertical direction when the user holds the image capturing apparatus so that the optical axis of the photographing optical system and the long side of the photographing frame become parallel to the ground. The pupil division direction in FIGS. 7A and 7B is the vertical direction. FIG. 7A is a plan view of 2×2 pixels including focus detection pixels. Similar to FIG. 6A, G pixels are left as image sensing pixels, and R and B pixels are replaced with focus detection pixels. In FIG. 7A, $S_{VC}$ and $S_{VD}$ represent focus detection pixels.

FIG. 7B is a sectional view taken along the line A-A in FIG. 7A. The pixel in FIG. 7B has the same structure as that in FIG. 6B except that the pixel in FIG. 6B has a structure for dividing the pupil in the lateral direction, but the pixel in FIG. 7B has a structure for dividing the pupil in the longitudinal direction. An aperture $OP_{VC}$ of the pixel $S_{VC}$ deviates down and receives a beam having passed through an upper exit pupil $EP_{VC}$ of the photographing optical system TL. Similarly, an aperture $OP_{VD}$ of the pixel $S_{VD}$ deviates up and receives a beam having passed through a lower exit pupil $EP_{VD}$ of the photographing optical system TL. Pixels $S_{VC}$ are arrayed regularly in the vertical direction, and an object image obtained by these pixels is defined as image C. Pixels $S_{VD}$ are also arrayed regularly in the vertical direction, and an object image obtained by these pixels is defined as image D. By detecting the relative positions of the images C and D, the defocus amount of the object image having a luminance distribution in the vertical direction can be detected.

FIG. 8 is a view schematically showing focus detection in the preferred embodiment of the present invention. The image sensor 107 has pupil-divided focus detection portions 901 each made up of a first focus detection pixel 901*a* and second focus detection pixel 901*b*. The image sensor 107 also includes image sensing pixels for photoelectrically converting an object image formed by the photographing optical system (image forming optical system). The CPU 121 includes a composition means 902, coupling means 903, and arithmetic means 904. The CPU 121 assigns a plurality of sections (areas) CST to the image sensing surface of the image sensor 107 to include a plurality of focus detection portions 901. The CPU 121 can properly change the size, arrangement, and number of sections CST. The composition means 902 composites signals output from the first focus detection pixels 901*a* in each of the sections CST assigned to the image sensor 107, obtaining the first composite signal of one pixel. The composition means 902 also composites signals output from the second focus detection pixels 901*b* in each section CST, obtaining the second composite signal of one pixel. The coupling means 903 couples the first composite signals of pixels in the sections CST, obtaining the first coupled signal. The coupling means 903 also couples the second composite signals, obtaining the second coupled signal. As a result, a coupled signal of signals from pixels by the number of sections is obtained for each of the first focus detection pixels 901*a* and second focus detection pixels 901*b*. The arithmetic means 904 calculates the defocus amount of the image forming optical system on the basis of the first and second coupled signals. In this manner, signals output from focus detection pixels in the same pupil division direction in each section are composited. Even if luminance corresponding to each focus detection portion is low, the luminance distribution of an object can be sufficiently detected. As will be described later, the image capturing capability for a thin line (high-frequency pattern) can improve by arranging the focus detection portions 901 at high density in the pupil division direction (horizontal direction in FIG. 8). In FIG. 8, the pupil is divided in the horizontal direction for descriptive convenience. The above-described processing also applies to a case where the pupil is divided in the vertical direction, which will be described later.

Figure 9:
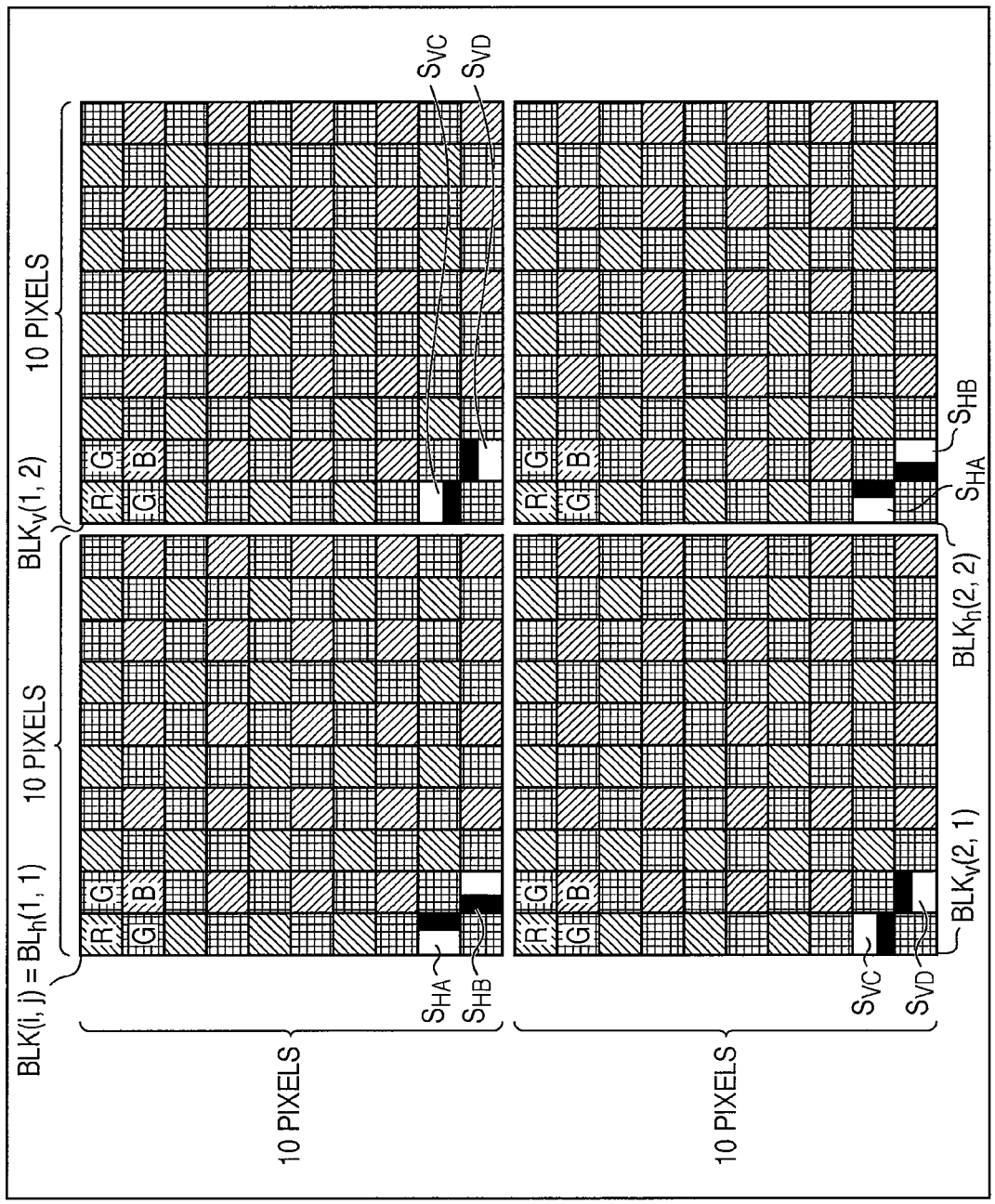
FIG. 9 is a view for explaining a pixel array of the image sensor for a minimum unit according to the first preferred embodiment of the present invention.
Figure 10:
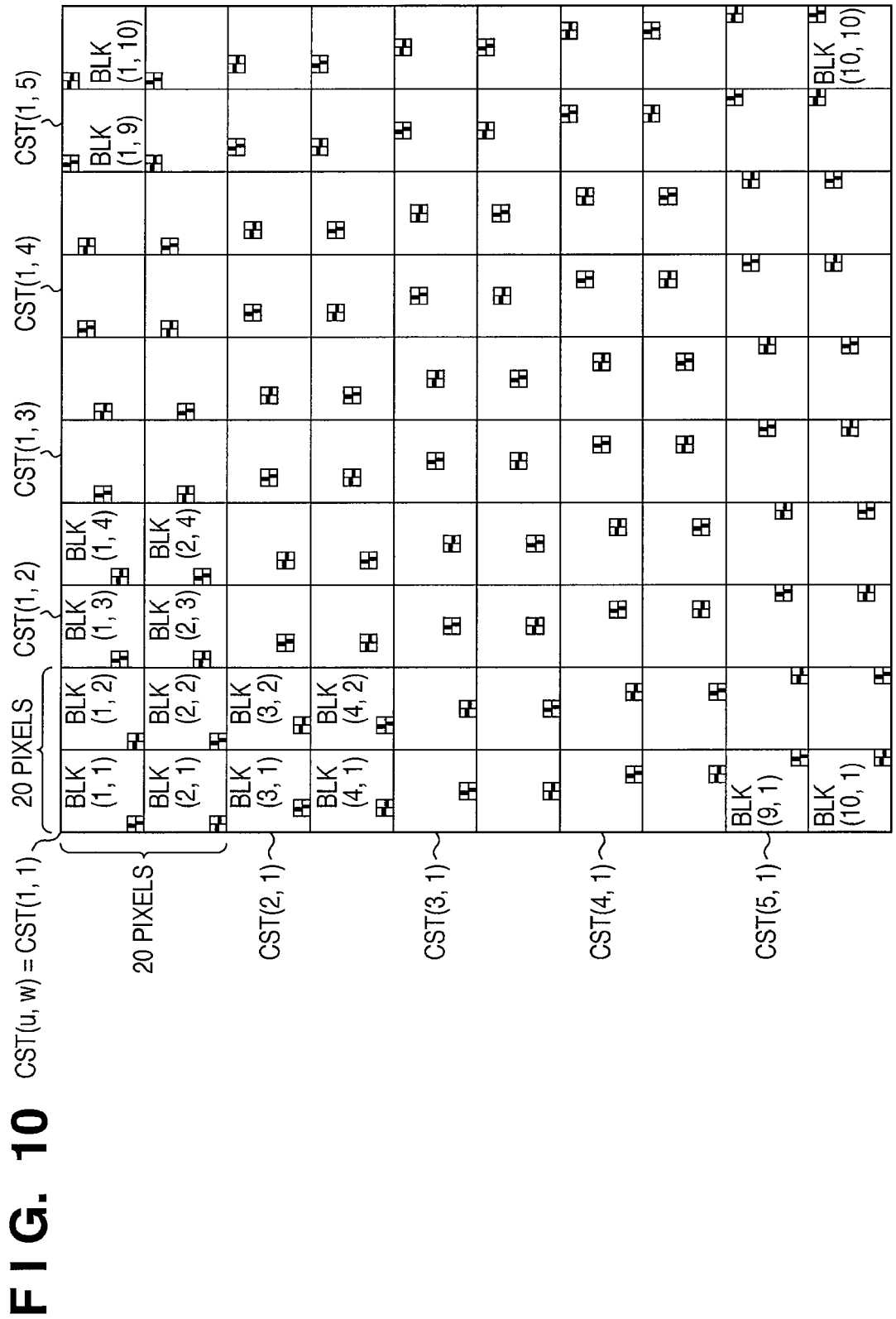
FIG. 10 is a view for explaining a pixel array of the image sensor for a superordinate unit according to the first preferred embodiment of the present invention.
Figure 11:
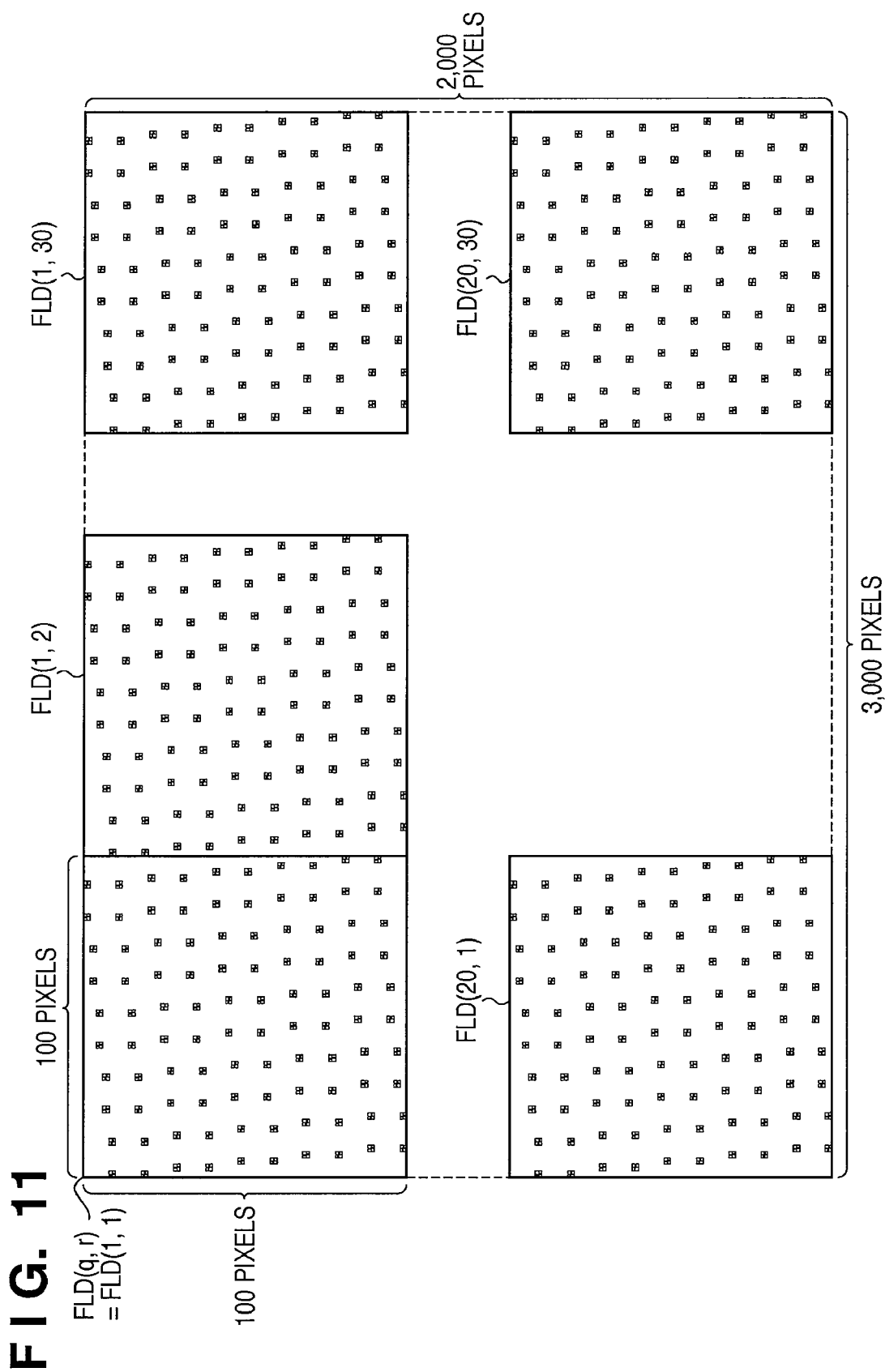
FIG. 11 is a view for explaining a pixel array in the entire area of the image sensor according to the first preferred embodiment of the present invention.

FIGS. 9 to 11 are views for explaining arrangement rules for image sensing pixels and focus detection pixels shown in FIGS. 5A to 7B.

FIG. 9 is a view for explaining an arrangement rule for a minimum unit according to the first preferred embodiment of the present invention when discretely arranging focus detection pixels between image sensing pixels. In FIG. 9, a square area of 10 rows×10 columns=100 pixels is defined as one block. In an upper left block $BLK_h$ (1,1), the bottom left R and B pixels are replaced with a pair of focus detection pixels (first focus detection portions) $S_{HA}$ and $S_{HA}$ for dividing the pupil in the horizontal direction (first direction).

In a block $BLK_v$ (1,2) on the right side of the block $BLK_h$ (1,1), the bottom left R and B pixels are similarly replaced with a pair of focus detection pixels (second focus detection portions) $S_{VC}$ and $S_{VD}$ for dividing the pupil in the vertical direction (second direction). A block $BLK_v$ (2,1) below the first block $BLK_h$ (1,1) has the same pixel array as that of the block $BLK_v$ (1,2). A block $BLK_h$ (2,2) on the right side of the block $BLK_v$ (2,1) has the same pixel array as that of the first block $BLK_h$ (1,1).

This arrangement rule is generalized to arrange a focus detection pixel for horizontal pupil division in a block BLK (i,j) when i+j is an even number, and a focus detection pixel for vertical pupil division in it when i+j is an odd number. An area of 2×2=4 blocks, i.e., 20 rows×20 columns=400 pixels in FIG. 9 is defined as a cluster which is an array unit superordinate to the block.

FIG. 10 is a view for explaining an arrangement rule for the cluster serving as a unit. In FIG. 10, the top left cluster of 20 rows×20 columns=400 pixels is defined as CST(u,w)=CST (1,1). In the cluster CST(1,1), the bottom left R and B pixels of each block are replaced with focus detection pixels $S_{HA}$ and $S_{HA}$ or $S_{VC}$ and $S_{VD}$.

In a cluster CST(1,2) on the right side of the cluster CTS (1,1), focus detection pixels in each block are arranged at positions shifted up by two pixels from those in the cluster CST(1,1). In a cluster CST(2,1) below the first cluster CTS (1,1), focus detection pixels in each block are arranged at positions shifted to the right by two pixels from those in the cluster CST(1,1). This rule is repetitively applied to obtain the arrangement shown in FIG. 10.

This arrangement rule is generalized as follows. The coordinates of a focus detection pixel are defined by those of an upper left pixel among a set of four pixels including G pixels shown in FIGS. 6A to 7B. The coordinates of the upper left corner of each block are defined as (1,1), and coordinates are incremented in the down and right directions.

When these definitions are applied, the horizontal coordinate of a focus detection pixel pair in each block of a cluster CST(u,w) is 2×u−1, and the vertical coordinate is 11−2×w. An area of 5×5=25 clusters, i.e., 100 rows×200 columns=10,000 pixels in FIG. 10 is defined as a field which is an array unit superordinate to the cluster.

FIG. 11 is a view for explaining an arrangement rule for the field serving as a unit. In FIG. 11, the top left field of 100 rows×100 columns=10,000 pixels is defined as FLD(q,r)=FLD(1,1). In the embodiment, all fields FLD(q,r) have the same array as that of the first field FLD(1,1). When 30×20 fields FLD(1,1) are arrayed in the horizontal and vertical directions, 600 fields form an image sensing area of 3,000 columns×2,000 rows=6,000,000 pixels. Focus detection pixels can be distributed uniformly in the entire image sensing area.

Figure 12:
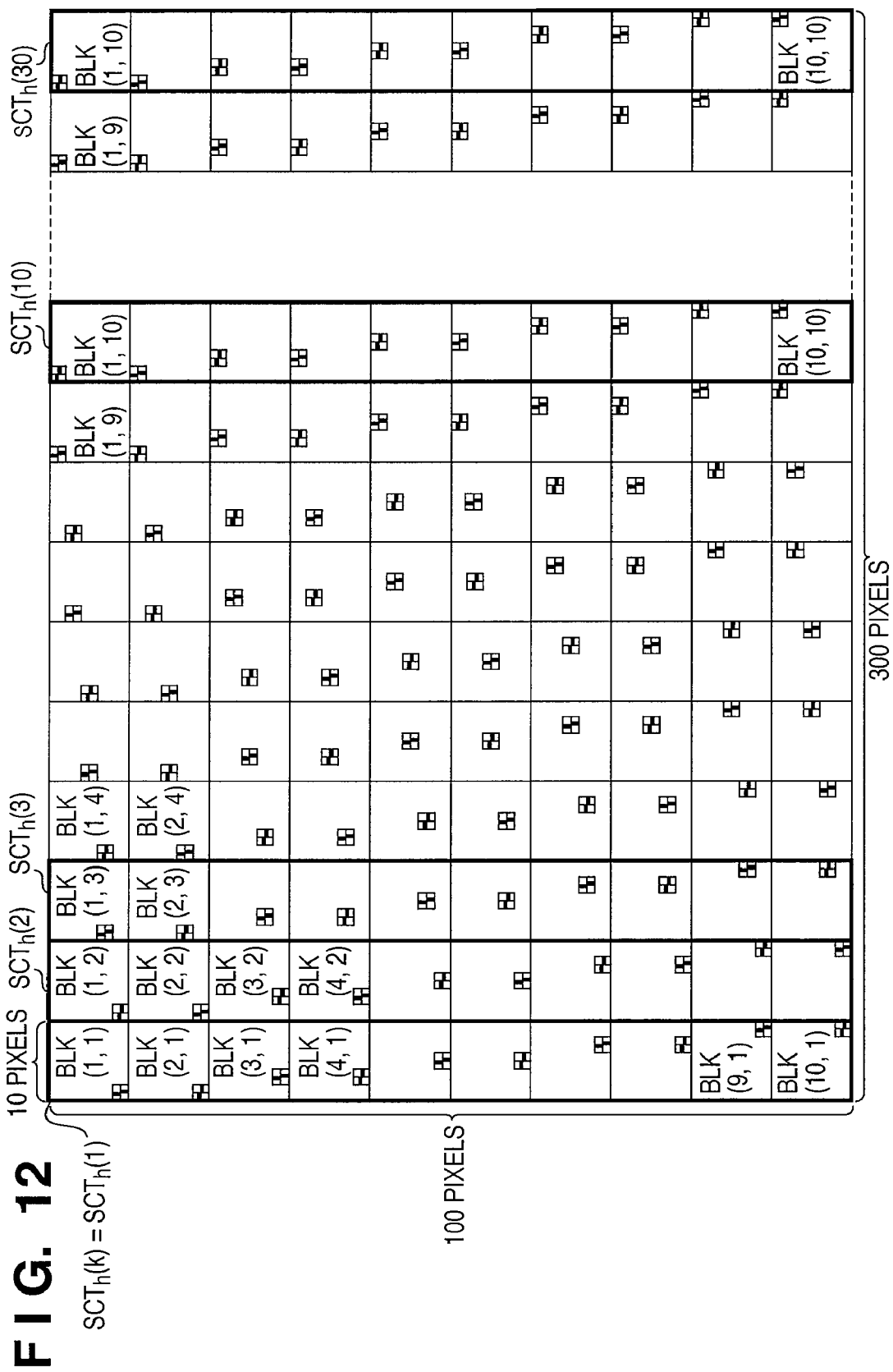
FIG. 12 is a view for explaining a pixel grouping method in lateral defocus detection according to the first preferred embodiment of the present invention.

A pixel group and signal addition method in focus detection will be explained with reference to FIGS. 12 to 15B. FIG. 12 is a view for explaining a pixel grouping method when detecting the lateral defocus of an object image formed by the photographing optical system. The lateral defocus detection is to perform phase-difference focus detection using focus detection pixels for dividing the exit pupil of the photographing optical system in the lateral direction (right-to-left direction or horizontal direction) described with reference to FIGS. 6A and 6B.

The pixel array shown in FIG. 12 is the same as that shown in FIG. 10. In focus detection, 1 block in the lateral direction× 10 blocks in the longitudinal direction=10 blocks in total are set as one group, which is defined as a section (first section). In the embodiment, for example, 30 sections aligned in the lateral direction form one focus detection area. That is, an area of 100 rows×300 columns=30,000 pixels serves as one focus detection area. One focus detection area is defined as an AF area. One section includes five pixels $S_{HA}$ corresponding to one divided pupil in the lateral direction, and five pixels $S_{HB}$ corresponding to other divided pupil. In the embodiment, outputs from the five pixels $S_{HA}$ are added into a signal of one pixel, obtaining one AF pixel of one image signal (called image A) for calculating the phase difference. Similarly, outputs from the five pixels $S_{HB}$ are added into a signal of one pixel, obtaining one AF pixel of the other image signal (called image B) for calculating the phase difference.

Figure 13A:
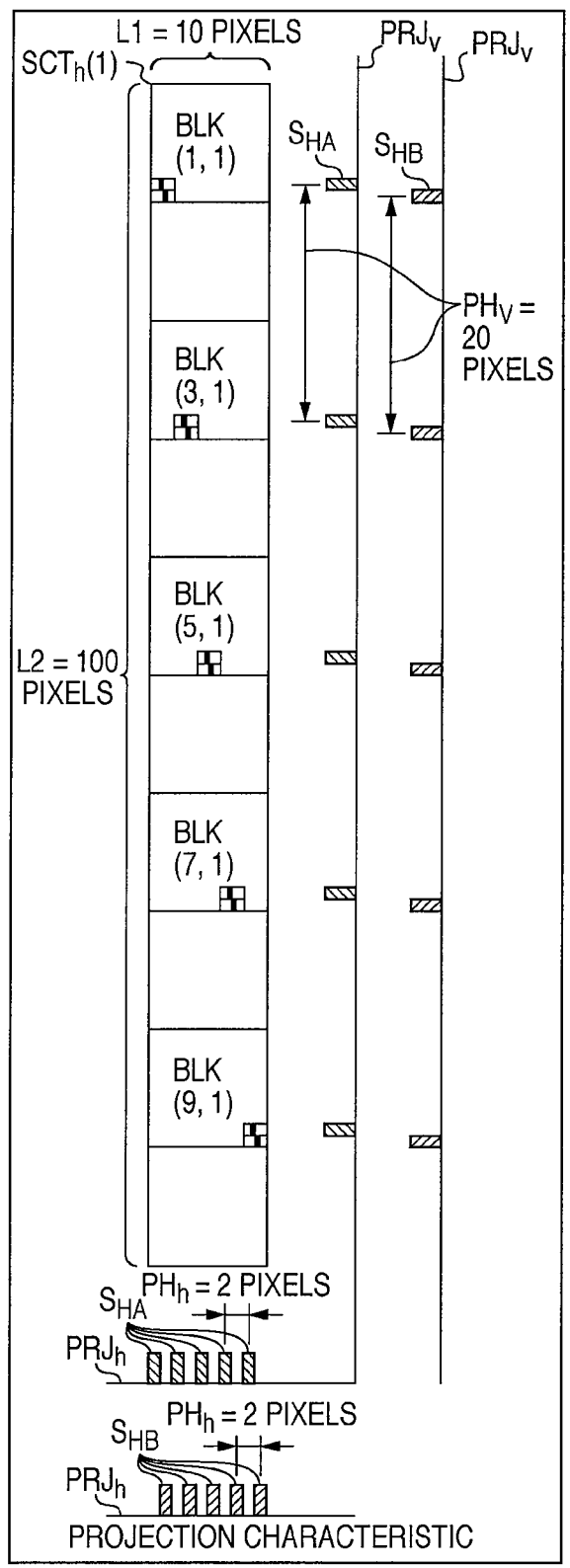
FIGS. 13A and 13B are views for explaining an image sampling characteristic in lateral defocus detection according to the first preferred embodiment of the present invention.
Figure 13B:
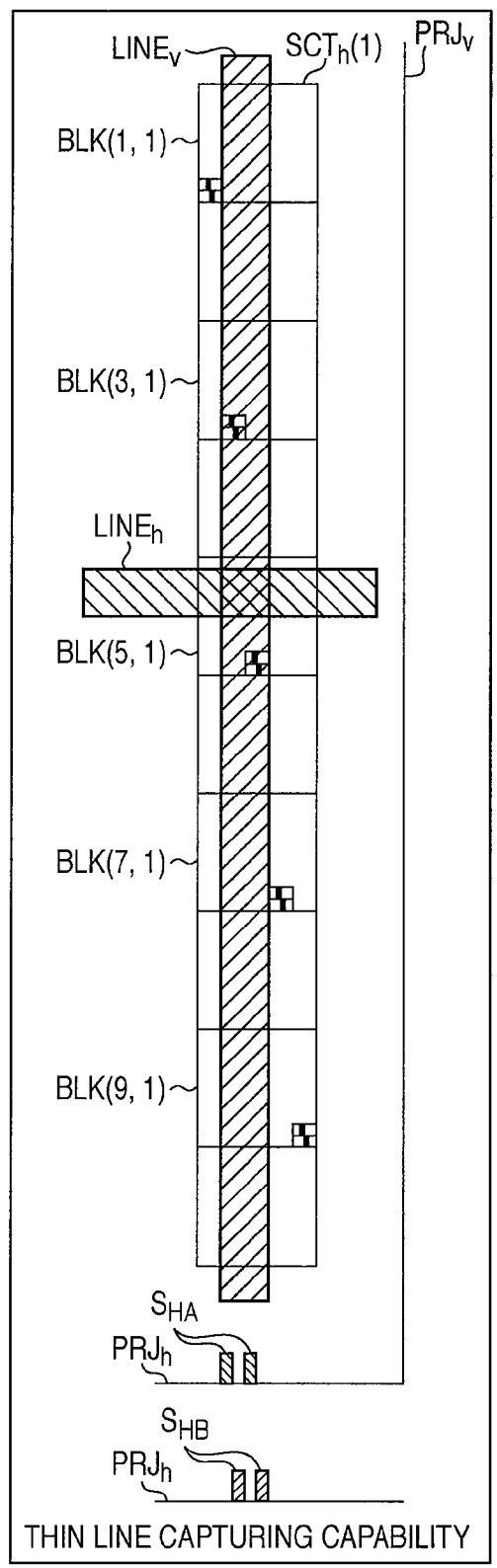

FIGS. 13A and 13B are views for explaining the object image capturing capability of one section. FIG. 13A shows a leftmost section cut out from FIG. 12. A horizontal line $PRJ_h$ shown at the bottom of FIG. 13A is the first projection line extending in the second direction perpendicular to the pupil division direction (first direction) of the focus detection pixels $S_{HA}$ and $S_{HB}$. A vertical line $PRJ_v$ shown on the right side of FIG. 13A is the second projection line extending in the pupil division direction. Signals from all pixels $S_{HA}$ in one section are added, and those from all pixels $S_{HB}$ are also added. When one section is regarded as one AF pixel, and light receiving portions included in one AF pixel are projected on the projection line $PRJ_h$ in the direction perpendicular to the pupil division direction, this reveals that the pixels $S_{HA}$ and $S_{HB}$ are alternately aligned densely. Letting P1 be the array pitch of the pixels $S_{HA}$ along the projection line $PRJ_h$ in the direction perpendicular to the pupil division direction, P1=$PH_h$=2 (the unit is a pixel). When the pitch is represented by a spatial frequency F1, F1=0.5 (the unit is a pixel/pixel). Similarly, the array pitch of the pixels $S_{HB}$ along the projection line $PRJ_h$ is P1=2 (the unit is a pixel), and the spatial frequency F1=0.5 (the unit is a pixel/pixel).

When light receiving portions included in one AF pixel are projected on the projection line $PRJ_v$ in the pupil division direction, this reveals that the pixels $S_{HA}$ and $S_{HB}$ are aligned sparsely. Letting P2 be the array pitch of the pixels $S_{HA}$ along the projection line $PRJ_v$, P2=$PH_v$=20 (the unit is a pixel). When the pitch is represented by a spatial frequency F2, F2=0.05 (the unit is a pixel/pixel). Similarly, the array pitch of the pixels $S_{HB}$ along the projection line $PRJ_v$ is P2=20 (the unit is a pixel), and the spatial frequency F2=0.05 (the unit is a pixel/pixel).

That is, as for the distribution characteristic before grouping, the AF pixel in the embodiment has the same arrangement pitches in the pupil division direction and the direction perpendicular to it. However, the group shape in grouping is designed into a rectangle to reduce the sampling error in the pupil division direction. More specifically, the maximum size L1 of one section in the direction perpendicular to the pupil division direction is 10 pixels, and the maximum size L2 in the pupil division direction is 100 pixels. By setting the section sizes to L1<L2, the sampling frequency F1 in the direction perpendicular to the pupil division direction is set high (dense), and the sampling frequency F2 in the pupil division direction is set low (sparse).

The image capturing capability when projecting an object image of a thin line onto the AF pixel (one section) shown in FIG. 13A will be explained with reference to FIG. 13B. In FIG. 13B, $LINE_v$ represents a thin vertical line projected on the image sensor 107, and has a width of four pixels in pixel conversion and 8 μm in the actual size of an image. At this time, focus detection pixels in the blocks BLK(3,1) and BLK (5,1) of the section $SCT_h(1)$ capture the object image. The minimum size of an object image is determined by the aberration of the photographing optical system and the characteristics of the optical LPF arranged in front of the image sensor. In general, even a very thin line has a width of two or more pixels. In one section according to the embodiment, at least one pixel $S_{HA}$ and one pixel $S_{HB}$ capture an image, preventing a capturing failure.

$LINE_h$ in FIG. 13B represents a thin horizontal line projected on the image sensor 107, and has a width of four pixels in pixel conversion and 8 μm in the actual size of an image, similar to the thin vertical line $LINE_v$. At this time, the horizontal line $LINE_h$ is projected on the block BLK(5,1), but is not captured by the focus detection pixels $S_{HA}$ and $S_{HB}$. However, the section $SCT_h(1)$ is used to detect the focus of an object having a luminance distribution in the lateral direction, like a vertical line. Thus, it does not matter if no focus detection pixel captures the image of an object having a luminance distribution in the longitudinal direction, like a horizontal line.

Figure 14:
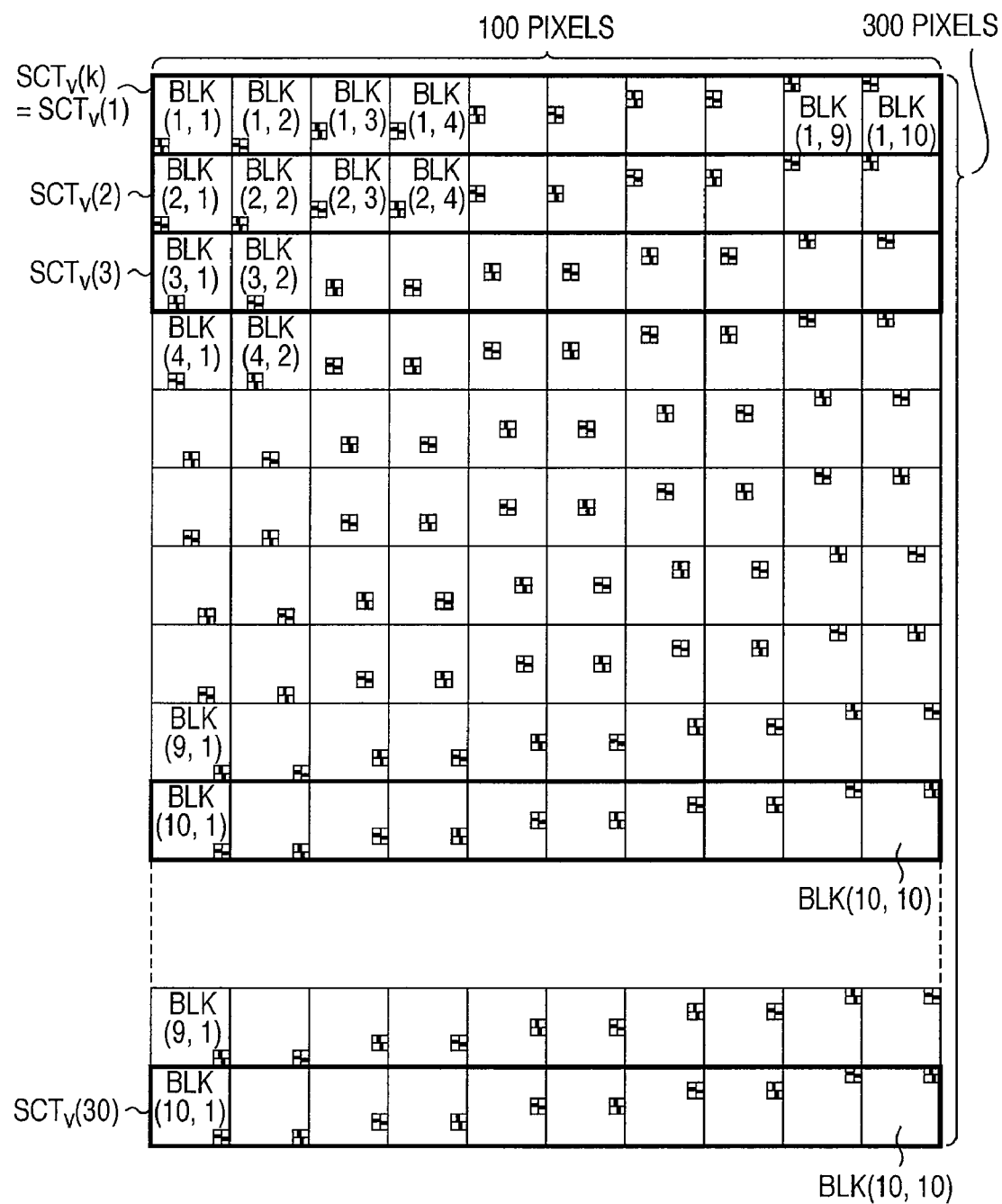
FIG. 14 is a view for explaining a pixel grouping method in longitudinal defocus detection according to the first preferred embodiment of the present invention.

FIG. 14 is a view for explaining a pixel grouping method when detecting the longitudinal defocus of an object image formed by the photographing optical system. The longitudinal defocus detection is to perform phase-difference focus detection using focus detection pixels for dividing the exit pupil of the photographing optical system in the longitudinal direction (top-to-bottom direction or vertical direction) described with reference to FIGS. 7A and 7B. FIG. 14 is a view obtained by rotating FIG. 12 through 90°.

The pixel array shown in FIG. 14 is also the same as that shown in FIG. 10. In focus detection, 10 blocks in the lateral direction×1 block in the longitudinal direction=10 blocks in total are set as one group, which is defined as a section (second section). In the embodiment, for example, 30 sections aligned in the longitudinal direction form one focus detection area. That is, an area of 300 rows×100 columns=30,000 pixels serves as one focus detection area. One focus detection area is defined as an AF area, similar to FIG. 12. One section includes five pixels $S_{VC}$ corresponding to one divided pupil in the longitudinal direction, and five pixels $S_{VD}$ corresponding to the other divided pupil. In the embodiment, outputs from the five pixels $S_{VC}$ are added to obtain one AF pixel of one image signal (called image C) for calculating the phase difference. Similarly, outputs from the five pixels $S_{VD}$ are added to obtain one AF pixel of the other image signal (called image D) for calculating the phase difference.

FIGS. 15A and 15B are views for explaining the object image capturing capability of one section. FIGS. 15A and 15B are views obtained by rotating FIGS. 13A and 13B through 90°. FIG. 15A shows a top section cut out from FIG. 14. A vertical line $PRJ_v$ shown on the right side of FIG. 15A is the third projection line extending in the first direction perpendicular to the pupil division direction (second direction) of the focus detection pixels $S_{VC}$ and $S_{VD}$. A horizontal line $PRJ_h$ shown at the bottom of FIG. 15A is the fourth projection line extending in the pupil division direction. Also in FIG. 15A, signals from all pixels $S_{VC}$ in one section are added, and those from all pixels $S_{VD}$ are also added. When one section is regarded as one AF pixel, and light receiving portions included in one AF pixel are projected on the projection line $PRJ_v$ in the direction perpendicular to the pupil division direction, this reveals that the pixels $S_{VC}$ and $S_{VD}$ are alternately aligned densely. Letting P1 be the array pitch of the pixels $S_{VC}$ along the projection line $PRJ_v$ in the direction perpendicular to the pupil division direction, $P1=PV_v=2$ (the unit is a pixel). When the pitch is represented by a spatial frequency F1, F1=0.5 (the unit is a pixel/pixel). Similarly, the array pitch of the pixels $S_{VD}$ along the projection line $PRJ_v$ is P1=2 (the unit is a pixel), and the spatial frequency F1=0.5 (the unit is a pixel/pixel).

When light receiving portions included in one AF pixel are projected on the projection line $PRJ_h$ in the pupil division direction, this reveals that the pixels $S_{VC}$ and $S_{VD}$ are aligned sparsely. Letting P2 be the array pitch of the pixels $S_{VC}$ along the projection line $PRJ_h$, $P2=PV_h=20$ (the unit is a pixel). When the pitch is represented by a spatial frequency F2, F2=0.05 (the unit is a pixel/pixel). Similarly, the array pitch of the pixels $S_{VD}$ along the projection line $PRJ_v$ is P2=20 (the unit is a pixel), and the spatial frequency F2=0.05 (the unit is a pixel/pixel).

In the pupil division direction, the sampling characteristic of the AF pixel in FIGS. 15A and 15B is F1>F2, similar to the characteristic shown in FIGS. 13A and 13B. This is because the section size L1 in the direction perpendicular to the pupil division direction and the size L2 in the pupil division direction are designed to L1<L2 even in the section in FIGS. 15A and 15B. Luminance information in the direction perpendicular to the pupil division direction can be accurately detected even for an object having high spatial frequency. In addition, even if the object luminance is low, the S/N ratio of the focus detection signal can be increased by adding signals from a plurality of pixels.

The image capturing capability when projecting an object image of a thin line onto the AF pixel (one section) shown in FIG. 15A will be explained with reference to FIG. 15B. In FIG. 15B, $LINE_h$ represents a thin horizontal line projected on the image sensor 107, and has a width of four pixels in pixel conversion and 8 μm in the actual size of an image. At this time, focus detection pixels in the blocks BLK(1,4) and BLK(1,6) of the section $SCT_v(1)$ capture the object image.

$LINE_v$ in FIG. 15B represents a thin vertical line projected on the image sensor 107, and has a width of four pixels in pixel conversion and 8 μm in the actual size of an image, similar to the thin horizontal line $LINE_h$. At this time, the vertical line $LINE_v$ is projected on the block BLK(1,6), but is not captured by the focus detection pixels $S_{VC}$ and $S_{VD}$. However, the section $SCT_v(1)$ is used to detect the focus of an object having a luminance distribution in the longitudinal direction, like a horizontal line. Thus, it does not matter if no focus detection pixel captures the image of an object having a luminance distribution in the lateral direction, like a vertical line.

Figure 16:
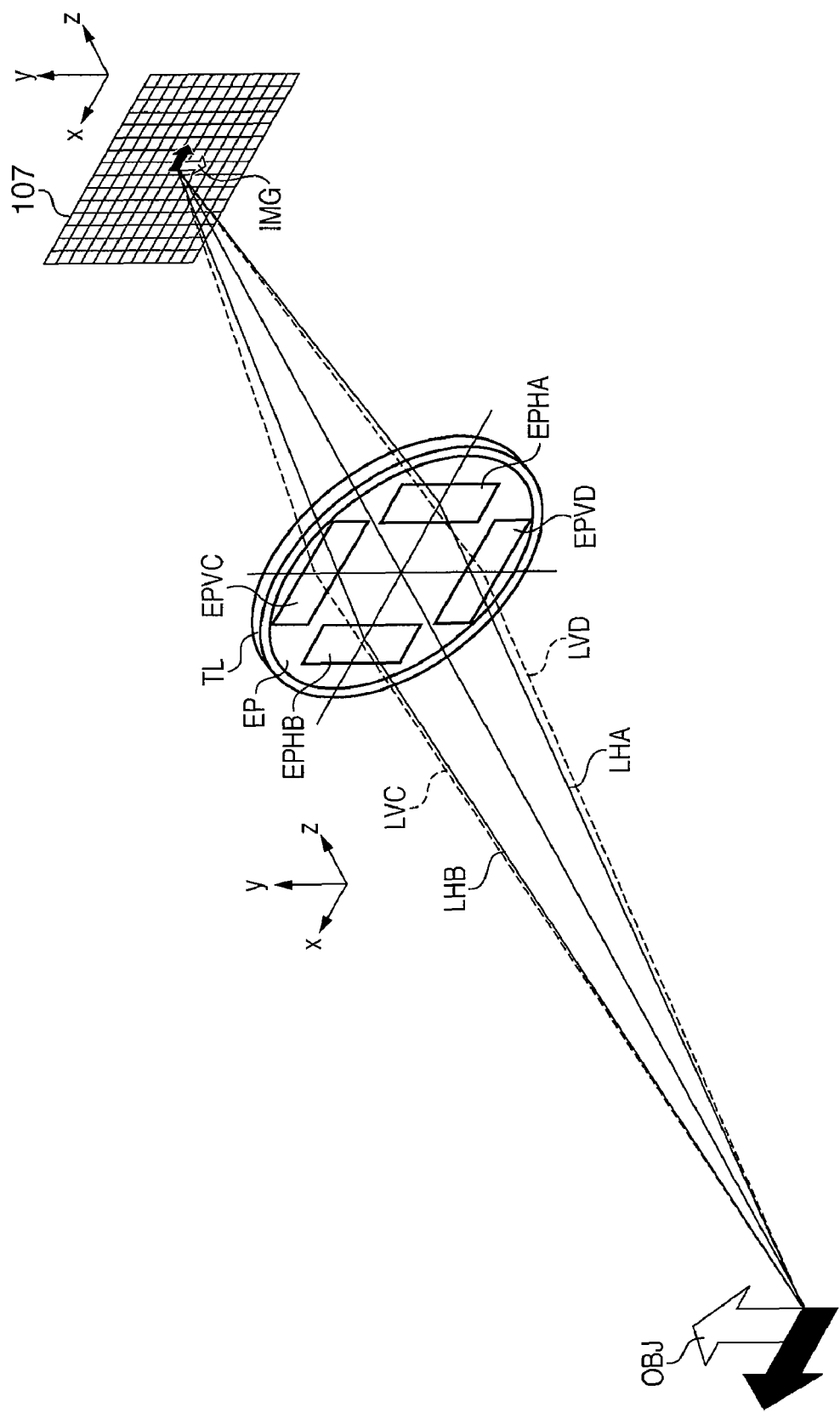
FIG. 16 is a view for explaining the concept of pupil division of the image sensor according to the first preferred embodiment of the present invention.

FIG. 16 is a view for explaining the concept of the pupil division function of the image sensor in the first embodiment. Reference symbol TL denotes a photographing optical system; 107, an image sensor; OBJ, an object; and IMG, an object image.

As described with reference to FIGS. 5A and 5B, an image sensing pixel receives a beam having passed through the entire exit pupil EP of the photographing optical system. To the contrary, a focus detection pixel has the pupil division function, as described with reference to FIGS. 6A to 7B. More specifically, the pixel $S_{HA}$ in FIG. 6A receives a beam LHA having passed through the left pupil when viewing the rear surface of the lens from the image sensing surface, i.e., a beam having passed through a pupil EPHA in FIG. 16. Similarly, the pixels $S_{HB}$, $S_{VC}$, and $S_{VD}$ receive beams LHB, LHC, and LHD having passed through pupils EPHB, EPVC, and EPVD. As described with reference to FIG. 11, focus detection pixels are distributed in the entire area of the image sensor 107, and can detect the focus even in the entire image sensing area.

Figure 17:
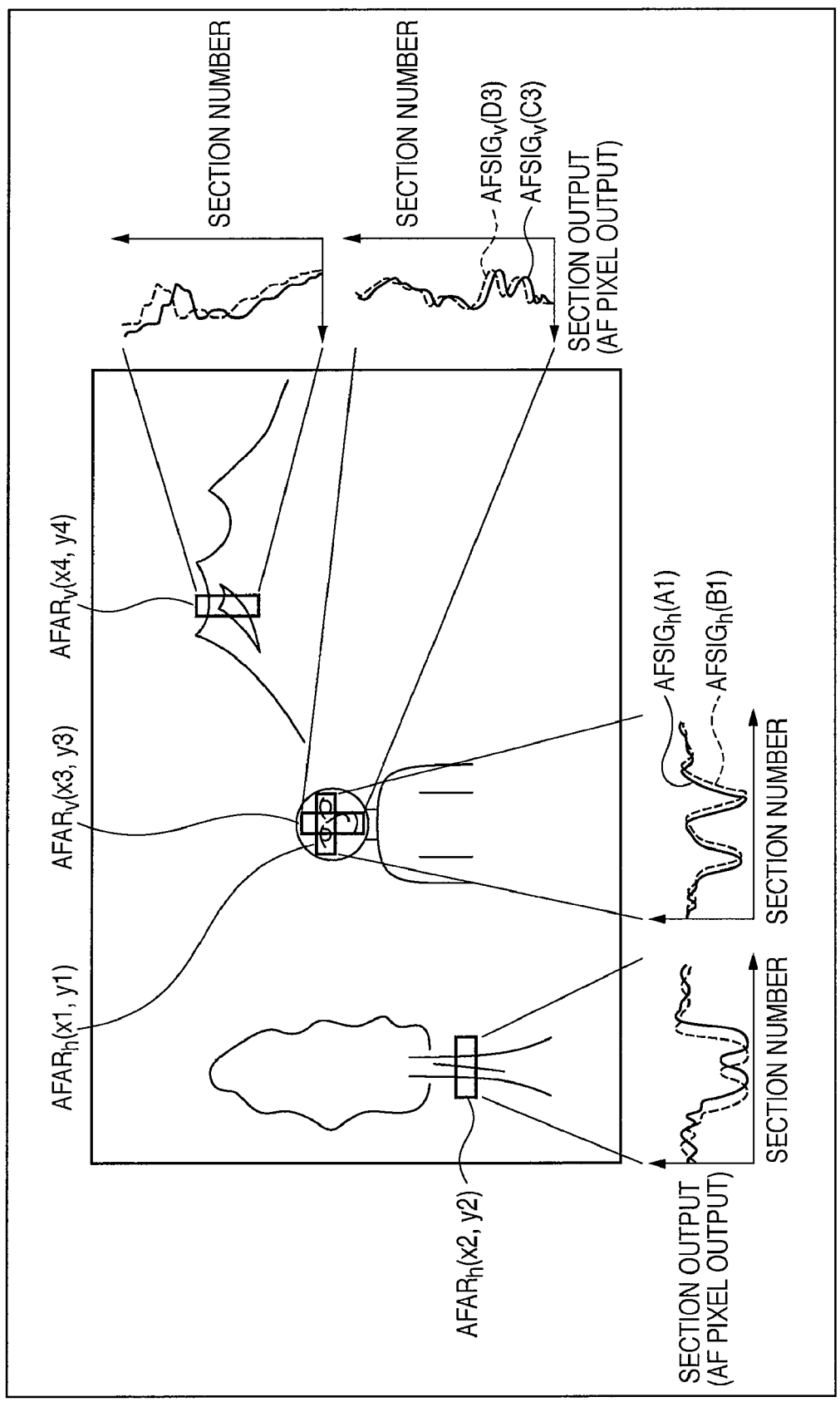
FIG. 17 is a view for explaining a focus detection area according to the first preferred embodiment of the present invention.

FIG. 17 is a view for explaining an image obtained in focus detection and a focus detection area. In FIG. 17, an object image formed on the image sensing surface includes a person at the center, a tree in the foreground on the left side, and mountains in the background on the right side. In the embodiment, pairs of pixels $S_{HA}$ and $S_{HB}$ for lateral defocus detection and pairs of pixels $S_{VC}$ and $S_{VD}$ for longitudinal defocus detection are arranged as focus detection pixels at equal densities in the entire image sensing area, as shown in FIG. 11. In lateral defocus detection, AF pixel signals for calculating the phase difference are processed for each group, as shown in FIGS. 12, 13A, and 13B. In longitudinal defocus detection, AF pixel signals for calculating the phase difference are processed for each group, as shown in FIGS. 14, 15A, and 15B. Distance measurement areas for lateral defocus detection and longitudinal defocus detection can be set at arbitrary positions in the image sensing area.

In FIG. 17, a person's face exists at the center of the frame. When the presence of the face is detected by a known face recognition technique, a focus detection area $AFAR_h$ (x1,y1) for lateral defocus detection and a focus detection area $AFAR_v$(x3,y3) for longitudinal defocus detection are set using the face area as a center. The suffix "h" represents the horizontal direction, and (x1,y1) and (x3,y3) indicate the coordinates of the upper left corners of focus detection areas. Signals from five focus detection pixels $S_{HA}$ included in each section of the focus detection area $AFAR_h$(x1,y1) are added, and a phase-difference detection image A signal obtained by coupling the added signals of 30 sections is defined as $AFSIG_h$(A1). Similarly, signals from five focus detection pixels $S_{HB}$ included in each section are added, and a phase-difference detection image B signal obtained by coupling the added signals of 30 sections is defined as $AFSIG_h$(B1). The relative lateral defocus amounts of the image A signal AFSIG$_h$(A1) and image B signal AFSIG$_h$(B1) are calculated by a known correlation calculation, obtaining the defocus amount of the object.

The defocus amount of the focus detection area AFAR$_v$(x3, y3) is also obtained in the same way. The two defocus amounts detected in the focus detection areas for lateral defocus and longitudinal defocus are compared, and a value of high reliability is adopted.

The trunk of the tree on the left side of the frame mainly has a vertical line component, i.e., a luminance distribution in the lateral direction, so it is determined that the trunk is an object suitable for lateral defocus detection. A focus detection area AFAR$_h$(x2,y2) for lateral defocus detection is set. The ridgeline of the mountains on the right side of the frame mainly has a horizontal line component, i.e., a luminance distribution in the longitudinal direction, so it is determined that the ridgeline is an object suitable for longitudinal defocus detection. A focus detection area AFAR$_v$(x4,y4) for longitudinal defocus detection is set.

As described above, according to the embodiment, focus detection areas for lateral defocus detection and longitudinal defocus detection can be set at arbitrary positions in the frame. Even if the projection position of an object and the direction of the luminance distribution vary, the focus can be detected accurately.

Figure 18:
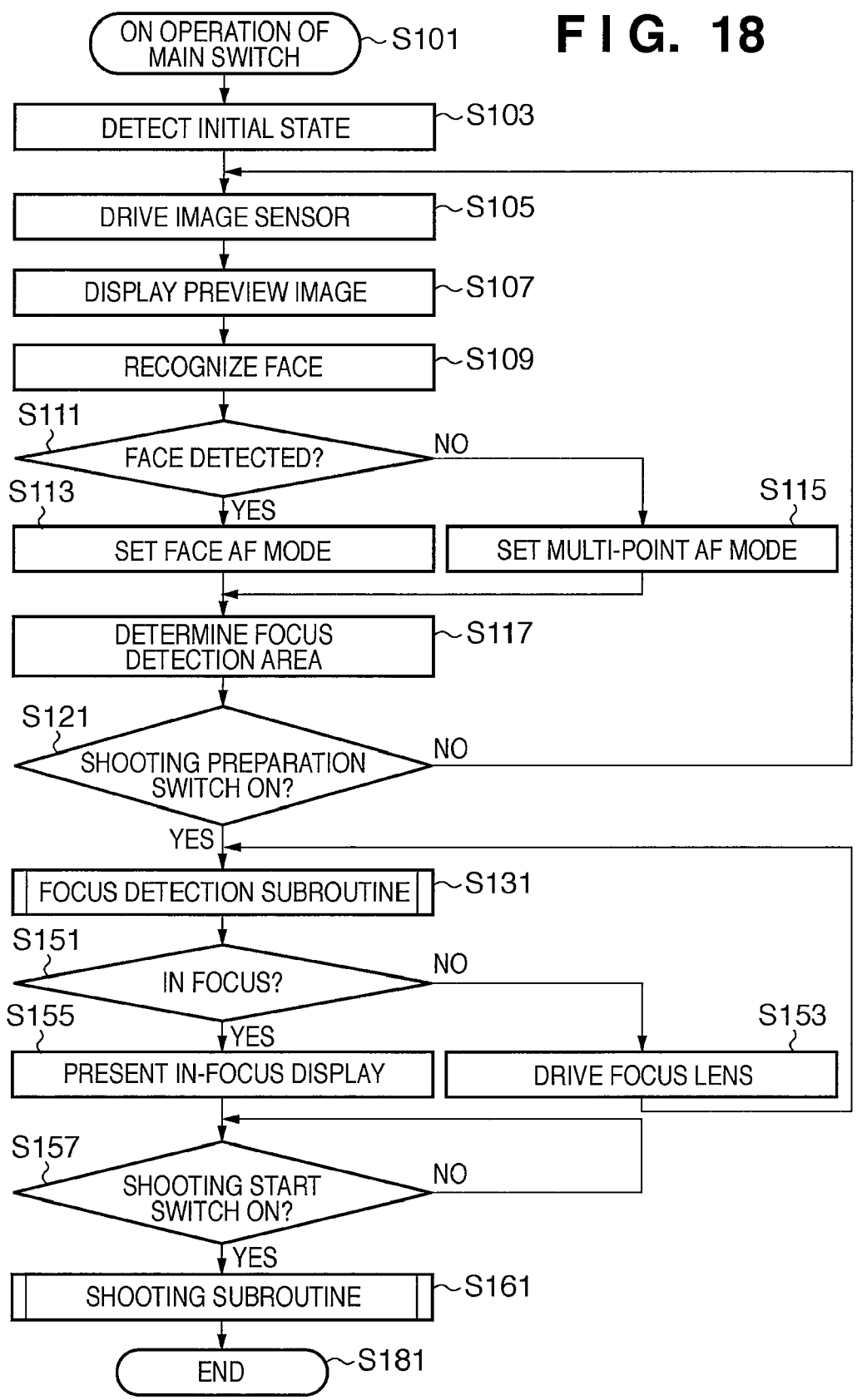
FIG. 18 is a flowchart of a main control routine according to the preferred embodiment of the present invention.
Figure 19:
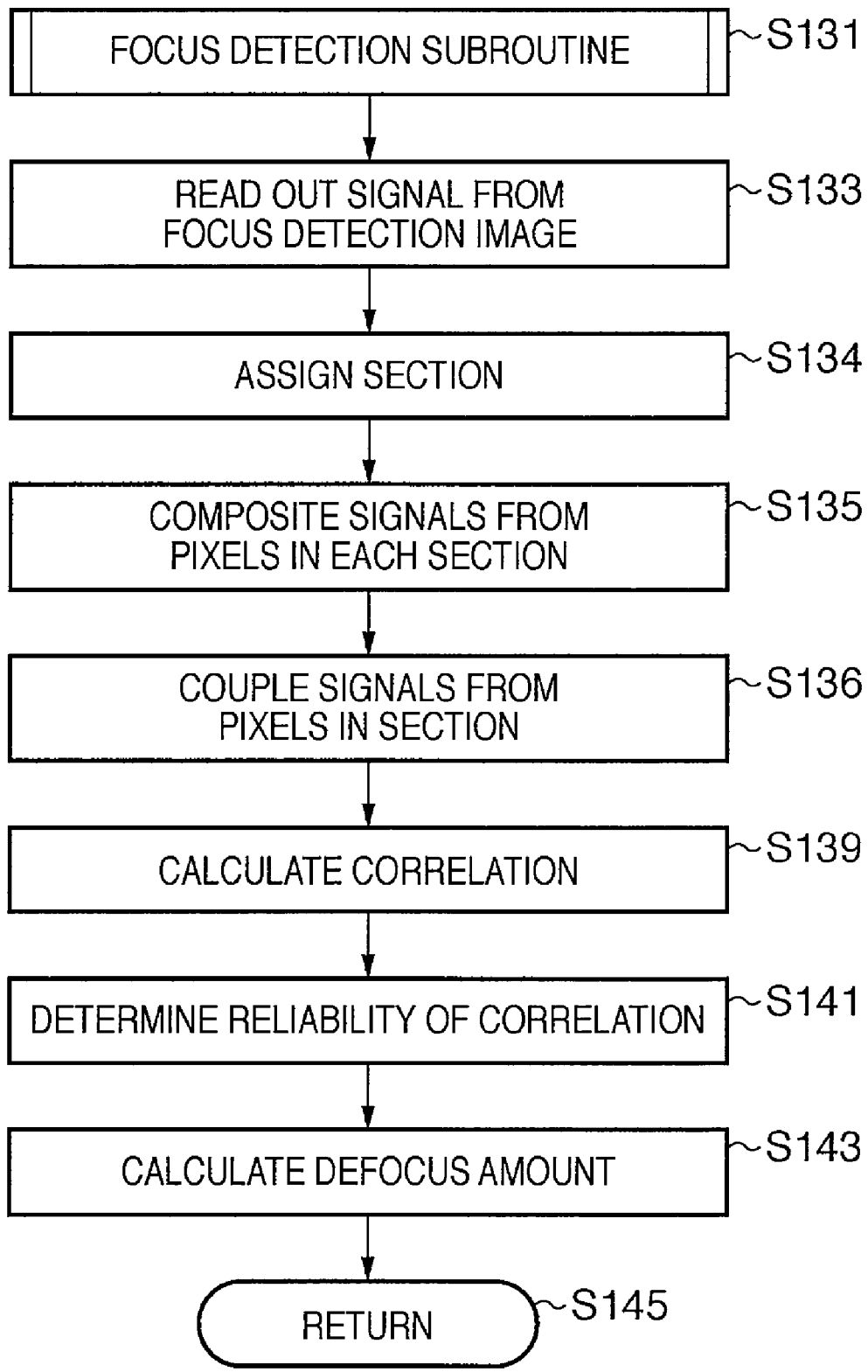
FIG. 19 is a flowchart of a focus detection subroutine according to the preferred embodiment of the present invention.
Figure 20:
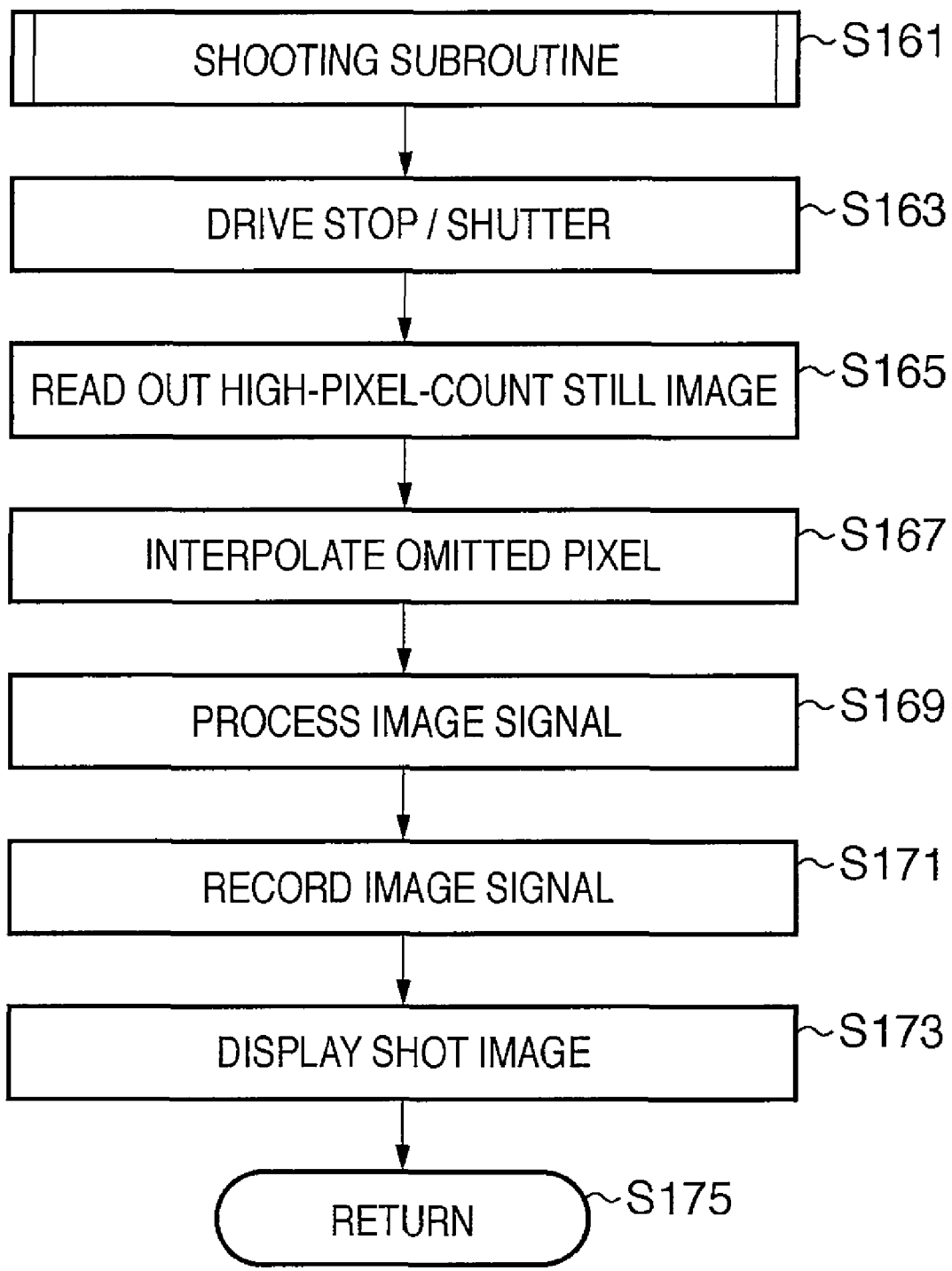
FIG. 20 is a flowchart of a shooting subroutine according to the preferred embodiment of the present invention.

FIGS. 18 to 20 are flowcharts for explaining control methods such as the focus adjustment and shooting methods of the image capturing apparatus according to the preferred embodiment of the present invention. The control methods of these flowcharts are similarly applicable to the second to fourth embodiments (to be described later). The CPU 121 in FIG. 1 executes each step in the flowcharts, unless otherwise specified. The control routines in FIGS. 18 to 20 will be explained with reference to FIGS. 1 to 17.

FIG. 18 shows the main routine of the image capturing apparatus according to the preferred embodiment of the present invention. In step S101, the user turns on the power switch of the image capturing apparatus. Then, in step S103, the CPU 121 checks the operations of the actuators and image sensor in the image capturing apparatus. The CPU 121 detects the initialized state of memory contents and executing programs, and executes a shooting preparation operation. In step S105, the CPU 121 starts the image sensing operation of the image sensor to output a low-pixel-count moving image for preview. In step S107, the CPU 121 displays the readout moving image on the display 131 attached to the rear surface of the image capturing apparatus. The user visually checks the preview image and determines the shooting composition.

In step S109, the CPU 121 determines whether a face exists in the preview moving image. If the CPU 121 determines that the face exists in the shooting area ("YES" in step S111), it shifts from step S111 to step S113 to set the focus adjustment mode to the face AF mode. The face AF mode is an AF mode in which the image capturing apparatus is focused on the face in the shooting area.

If the CPU 121 determines that no face exists in the shooting area ("NO" in step S111), it shifts from step S111 to step S115 to set the focus adjustment mode to the multi-point AF mode. The multi-point AF mode is a mode in which the shooting area is divided into 3×5=15, focus detection is done in the divided areas, a principal object is analogized from the focus detection result and luminance information of the object, and the image capturing apparatus is focused on the area of the main object.

After determining the AF mode in step S113 or S115, the CPU 121 determines a focus detection area in step S117. In step S121, the CPU 121 determines whether the user has turned on the shooting preparation switch. If the user has not turned on the shooting preparation switch, the CPU 121 returns to step S105 to repetitively execute the processing from driving of the image sensor to determination of the focus detection area in step S117.

If the user has turned on the shooting preparation switch in step S121, the CPU 121 shifts to step S131 to execute a focus detection subroutine.

FIG. 19 is a flowchart of the focus detection subroutine. When the process advances from step S121 in the main routine to step S131 in the subroutine, the CPU 121 reads out signals from focus detection pixels included in the focus detection area determined in step S117 of the main routine. In step S134, the CPU 121 assigns a plurality of sections to the image sensing surface of the image sensor 107 to include at least two focus detection portions 901. The sections are preferably arranged not to overlap each other. It is also possible to assign sections such that all the focus detection portions 901 of the image sensing surface of the image sensor 107 are arranged in a given sections, or some focus detection portions 901 are not arranged in any section. In step S135, the CPU 121 composites signals output from the first focus detection pixels of the focus detection portions 901 in each of the sections assigned in step S134, obtaining the first composite signal. Similarly, the CPU 121 composites signals output from the second focus detection pixels in each of the sections assigned in step S134, obtaining the second composite signal. In step S136, the CPU 121 couples the first composite signals obtained in step S135 from the sections assigned in step S134, obtaining the first coupled signal. Similarly, the CPU 121 couples the second composite signals obtained in step S135 from the sections assigned in step S134, obtaining the second coupled signal. The first and second coupled signals correspond to two image signals for calculating the correlation. More specifically, the first and second coupled signals correspond to a pair of signals AFSIG$_h$(A1) and AFSIG$_h$(B1) or AFSIG$_v$(C3) and AFSIG$_v$(D3) shown in FIG. 17. In step S139, the CPU 121 calculates the correlation between the two obtained image signals, calculating the relative positional error amounts of the two image signals. In step S141, the CPU 121 determines the reliability of the correlation calculation result in step S139. The reliability means the coincidence between two image signals, and when the coincidence between two image signals is high, the reliability of the focus detection result is generally high. When a plurality of focus detection areas are selected, information having high reliability is preferentially used.

In step S143, the CPU 121 calculates a defocus amount from the detection result having high reliability. In step S145, the CPU 121 returns to step S151 in the main routine of FIG. 18.

In step S151 of FIG. 18, the CPU 121 determines whether the defocus amount calculated in step S143 of FIG. 19 is equal to or smaller than an allowance. If the defocus amount exceeds the allowance, the CPU 121 determines that the image is out of focus, drives the focus lens in step S153, and then repetitively executes steps S131 to S151. If the CPU 121 determines in step S151 that the image is in focus, the CPU 121 presents an in-focus display in step S155, and shifts to step S157.

In step S157, the CPU 121 determines whether the user has turned on the shooting start switch. If the user has not turned on the shooting start switch, the CPU 121 maintains the shooting standby state in step S157. If the user has turned on the shooting start switch in step S157, the CPU 121 shifts to step S161 to execute a shooting subroutine.

FIG. 20 is a flowchart of the shooting subroutine. When the user operates the shooting start switch, the CPU 121 drives the light quantity adjustment stop in step S163 after step S161, controlling the aperture of the mechanical shutter for defining the exposure time. In step S165, the CPU 121 reads out an image for shooting a still image using a large number of pixels, i.e., reads out signals from all pixels. In step S167, the CPU 121 interpolates an omitted pixel of a readout image signal. That is, an output from a focus detection pixel does not contain RGB color information for image sensing, and the focus detection pixel is defective when obtaining an image. Hence, an image signal is generated by interpolation using information of peripheral image sensing pixels.

The CPU 121 performs image processes such as γ correction and edge emphasis of an image in step S169, and records a shot image in the flash memory 133 in step S171. The CPU 121 displays the shot image on the display 131 in step S173, and returns to the main routine of FIG. 18 in step S175.

After returning to the main routine of FIG. 18, the CPU 121 ends a series of shooting operations in step S181.

As described above, according to the first preferred embodiment of the present invention, outputs from focus detection pixels having the pupil division function can be composited and used for focus detection calculation, thereby improving the sampling characteristic and S/N ratio of the focus detection signal. Since focus detection pixels are discretely arranged, few image sensing pixels are omitted, avoiding degradation of a shot image.

The AF pixel for obtaining a phase-difference detection signal is rectangular, and a composite signal of outputs from focus detection pixels in this rectangular area is used as a signal of one AF calculation pixel. A size of the rectangular area in the direction perpendicular to the pupil division direction is set smaller than that in the pupil division direction. This can prevent degradation of the sampling capability of the AF pixel in the direction perpendicular to the pupil division direction. A failure in capturing a thin line or high-frequency object can be prevented, improving the focus detection performance.

Lateral defocus detection pixels and longitudinal defocus detection pixels can be arranged in a checkered pattern at substantially equal intervals and equal arrangement densities. The focus can be accurately detected for both an object having a luminance distribution in the lateral direction and an object having a luminance distribution in the longitudinal direction.

The embodiment has exemplified a case where focus detection pixels are distributed in the entire area of the image sensing surface of the image sensor, but the present invention is not limited to this. For example, a change of arranging no focus detection pixel in the peripheral area of the image sensor can be made without departing from the scope of the present invention.

Second Embodiment

In the first embodiment, paired lateral defocus detection pixels or paired longitudinal defocus detection pixels are assigned to the positions of R and B pixels diagonally adjacent to each other. In the second embodiment, focus detection pixels are assigned to the positions of pixels of a single color, i.e., only R or B pixels. The arrangement of the second embodiment will be explained with reference to FIGS. 21 to 25B.

Figure 21:
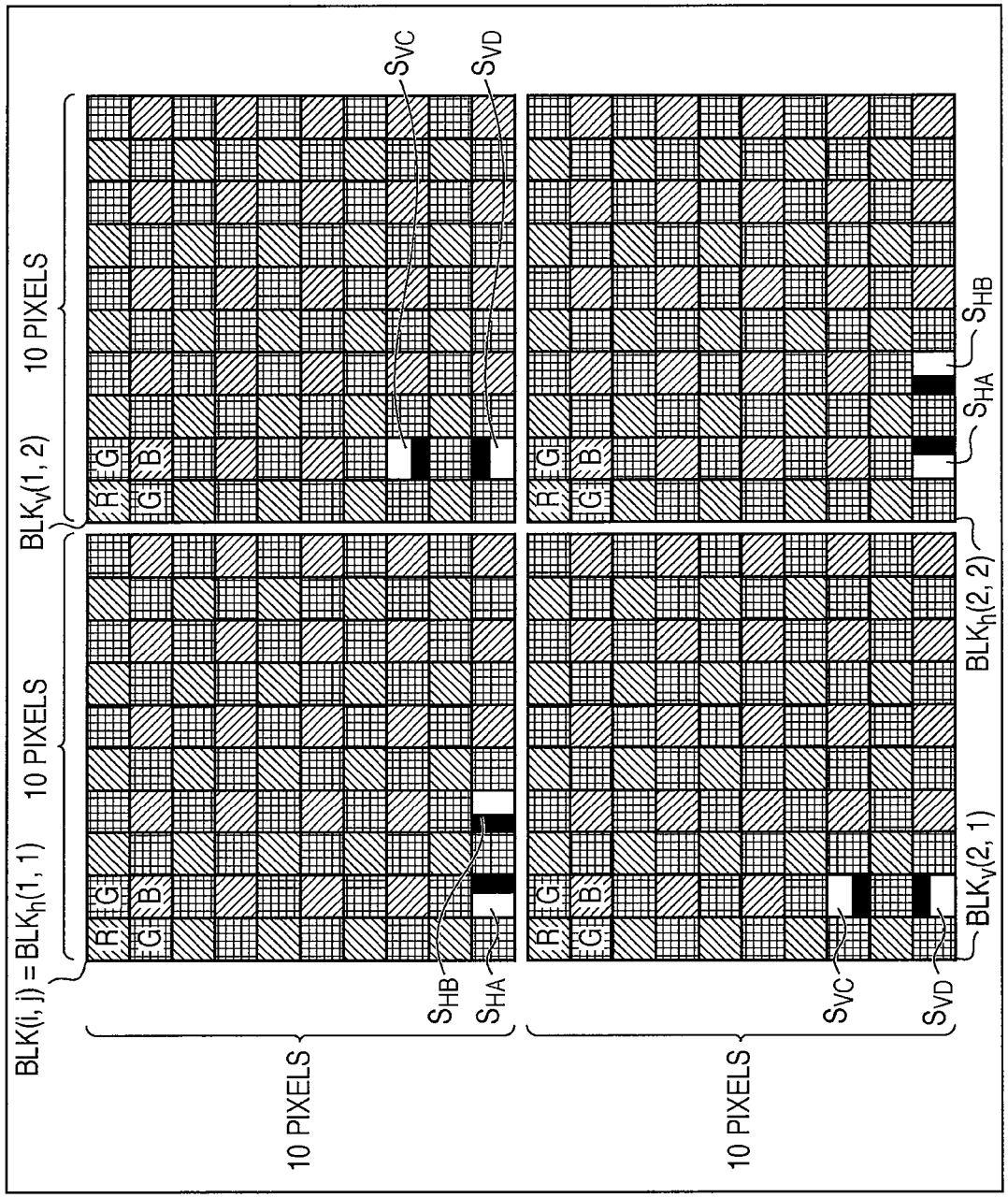
FIG. 21 is a view for explaining a pixel array of an image sensor for a minimum unit according to the second preferred embodiment of the present invention.

FIG. 21 is a view showing a focus detection pixel array according to the second embodiment, and corresponds to FIG. 9 in the first embodiment. In the first embodiment shown in FIG. 9, the focus detection pixels $S_{HA}$, $S_{HB}$, $S_{VC}$ and $S_{VD}$ are assigned to the positions of R and B pixels diagonally adjacent to each other among image sensing pixels having the Bayer array. In the second embodiment shown in FIG. 21, focus detection pixels are assigned to only B pixels in the Bayer array. More specifically, in each of the top left block $BLK_h(1,1)$ and lower right block $BLK_h(2,2)$, two B pixels near the left on the bottom row are replaced with a pair of focus detection pixels $S_{HA}$ and $S_{HB}$ for dividing the pupil in the horizontal direction.

In each of the remaining blocks $BLK_v(1,2)$ and $BLK_v(2,1)$, two B pixels near the bottom on the second column from the left are replaced with a pair of focus detection pixels $S_{VC}$ and $S_{VD}$ for dividing the pupil in the vertical direction.

This arrangement rule is generalized to arrange a focus detection pixel for horizontal pupil division in a block BLK (i,j) when i+j is an even number, and a focus detection pixel for vertical pupil division in it when i+j is an odd number, similar to the first embodiment. An area of 2×2=4 blocks, i.e., 20 rows×20 columns=400 pixels is defined as a cluster.

Figure 22:
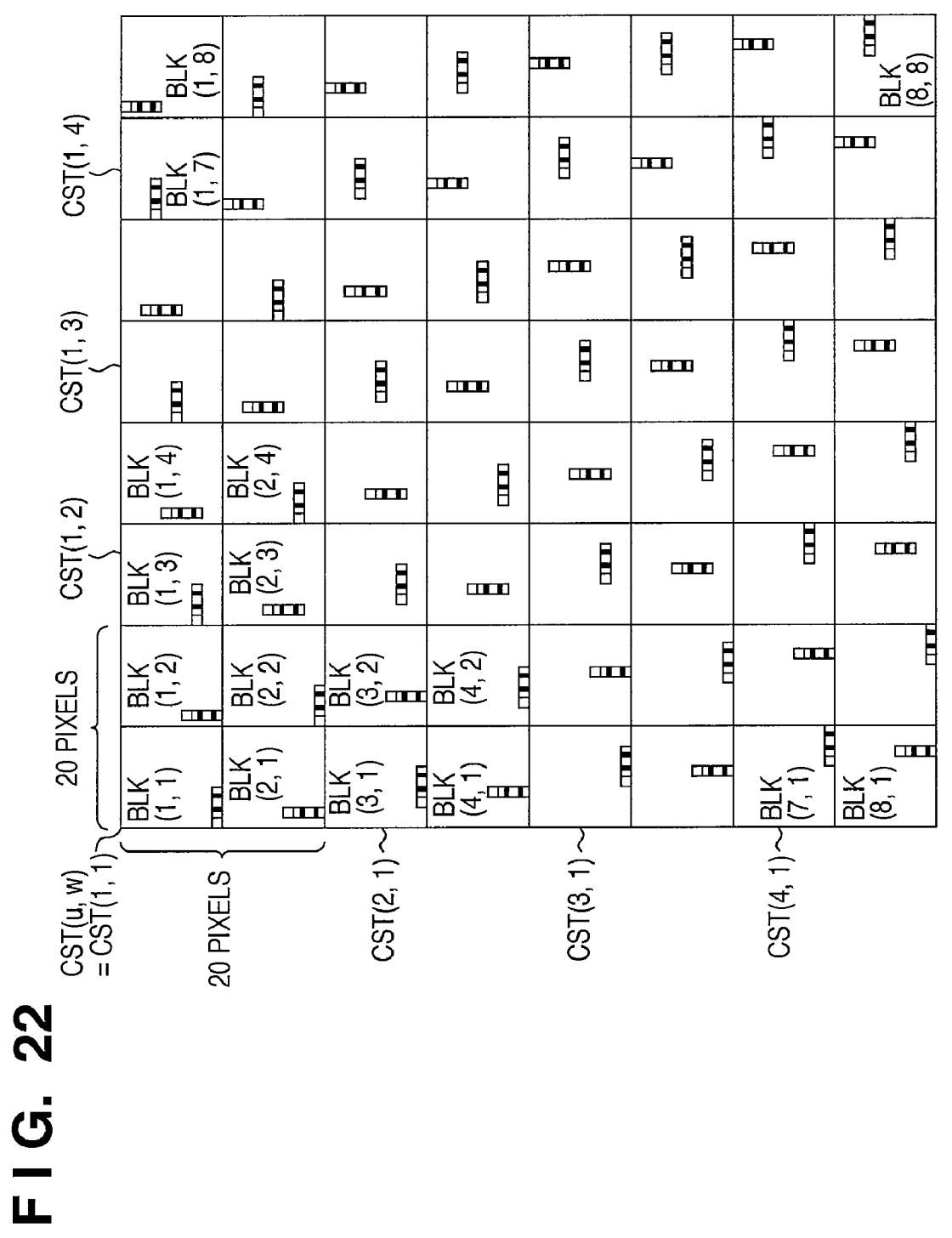

FIG. 22 is a view for explaining an arrangement rule for the cluster serving as a unit, and corresponds to FIG. 10 in the first embodiment. In FIG. 22, the top left cluster of 20 rows×20 columns=400 pixels is defined as CST(u,w)=CST(1,1). In the cluster CST(1,1), B pixels near the lower left corner of each block are replaced with focus detection pixels $S_{HA}$ and $S_{HA}$ or $S_{VC}$ and $S_{VD}$.

In a cluster CST(1,2) on the right side of the cluster CTS (1,1), focus detection pixels in each block are arranged at positions shifted up by two pixels from those in the cluster CST(1,1). In a cluster CST(2,1) below the first cluster CTS (1,1), focus detection pixels in each block are arranged at positions shifted to the right by two pixels from those in the cluster CST(1,1). This rule is repetitively applied to obtain the arrangement shown in FIG. 22. The range shown in FIG. 22 serves as a field superordinate to the cluster. Note that one field includes 5×5=25 clusters in the first embodiment shown in FIG. 10, but 4×4=16 clusters in the second embodiment.

Figure 23:
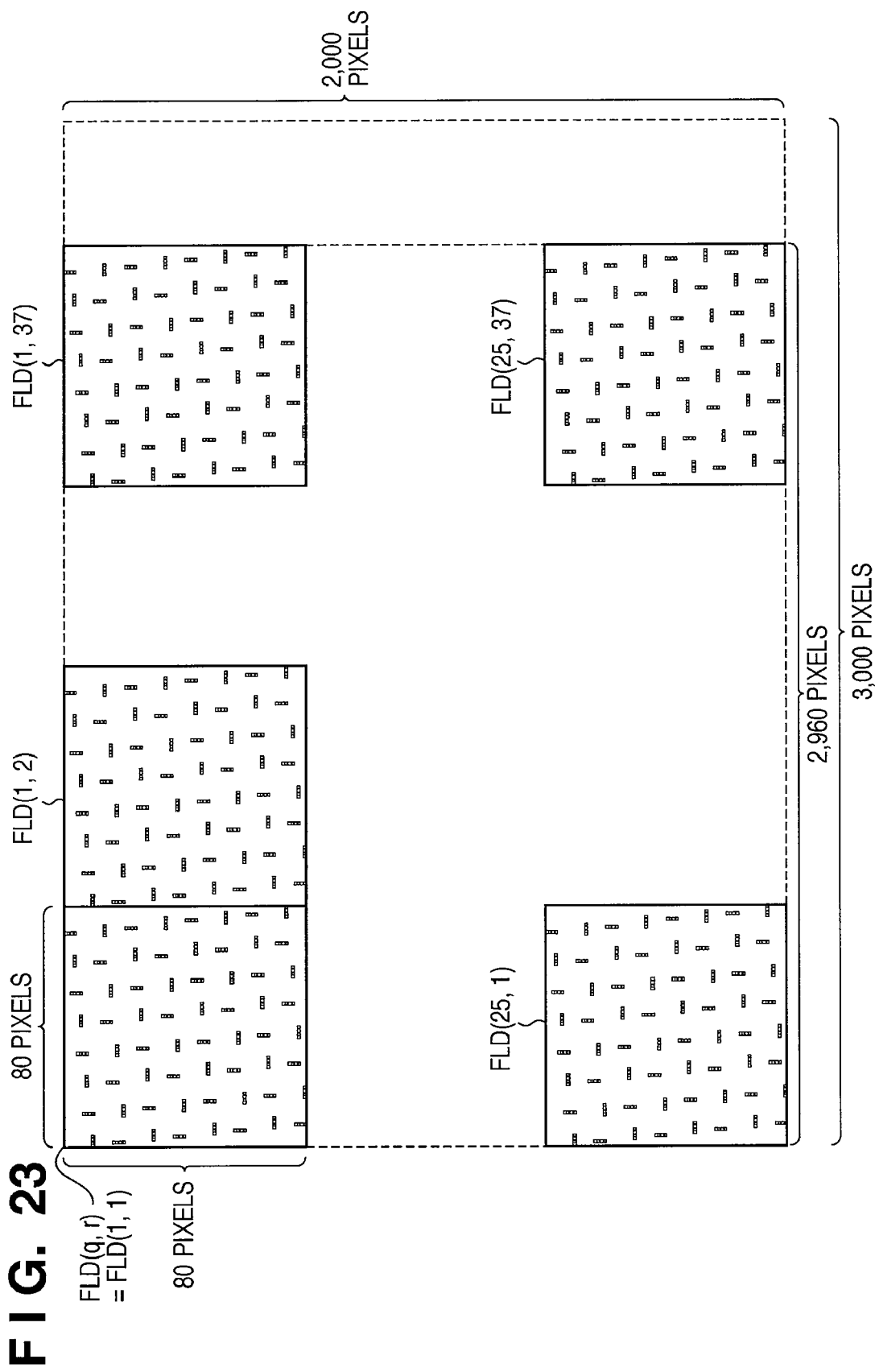
FIG. 23 is a view for explaining a pixel array in the entire area of the image sensor according to the second preferred embodiment of the present invention.

FIG. 23 is a view for explaining an arrangement rule for the field serving as a unit, and corresponds to FIG. 11 in the first embodiment. In FIG. 23, the top left field of 80 rows×80 columns=6,400 pixels is defined as FLD(q,r)=FLD(1,1). Also in the second embodiment, all fields FLD(q,r) have the same array as that of the first field FLD(1,1). When 37×25 fields FLD(1,1) are arrayed in the horizontal and vertical directions, 925 fields form an image sensing area of 3,000 columns×2,000 rows=6,000,000 pixels. An incomplete area of 40 columns at the right end cannot form one field, and no focus detection pixel is arranged in this area. However, focus detection pixels can be distributed substantially uniformly in the entire image sensing area.

Figure 24:
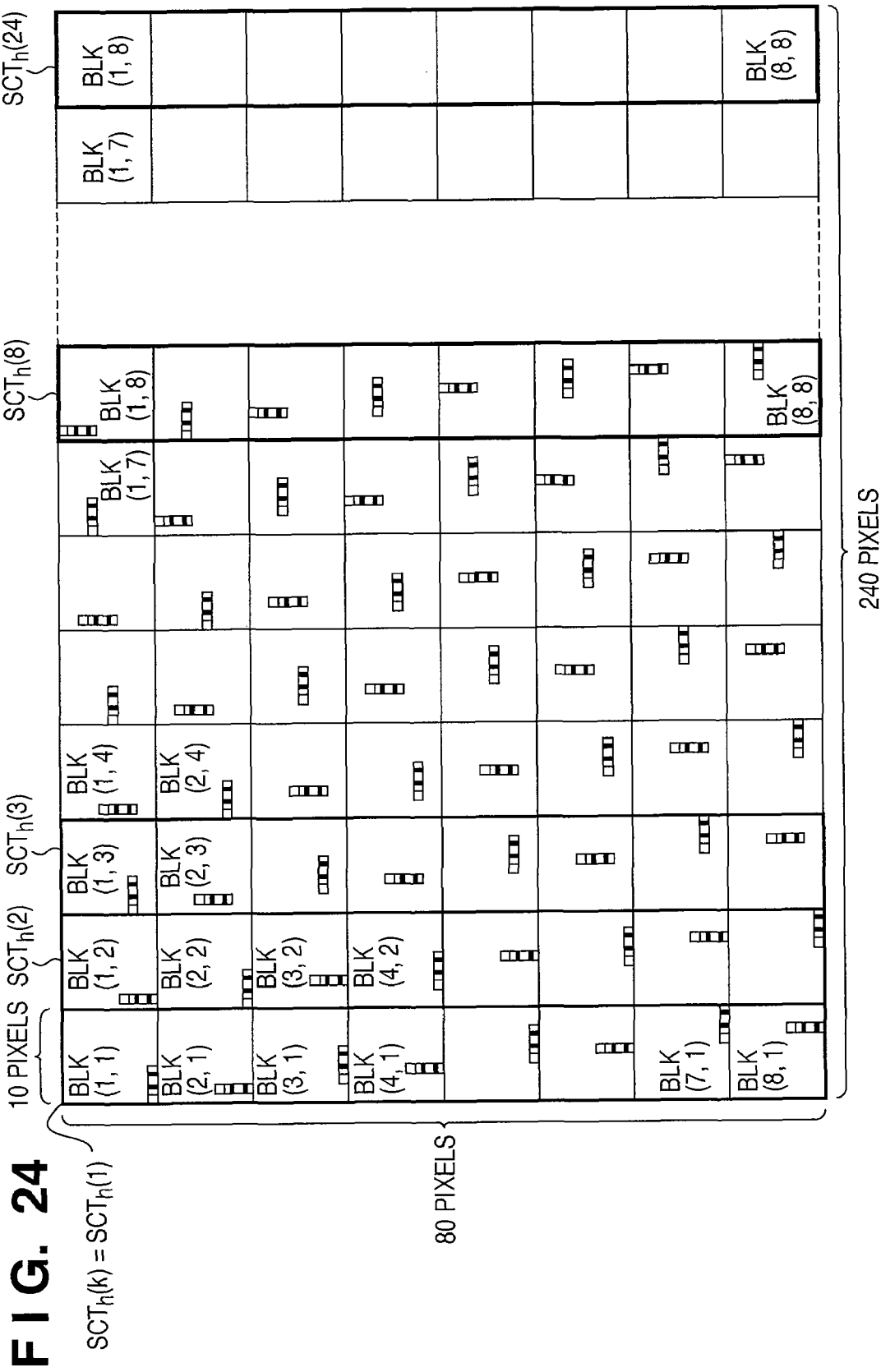
FIG. 24 is a view for explaining a pixel grouping method in lateral defocus detection according to the second preferred embodiment of the present invention.

A pixel group and signal addition method in focus detection will be explained with reference to FIGS. 24, 25A, and 25B. FIG. 24 is a view for explaining a pixel grouping method when detecting the lateral defocus of an object image formed by the photographing optical system. FIG. 24 corresponds to FIG. 12 in the first embodiment.

The pixel array shown in FIG. 24 is the same as that shown in FIG. 22. In focus detection, 1 block in the lateral direction×8 blocks in the longitudinal direction=8 blocks in total are defined as a section. In the second embodiment, 24 sections aligned in the lateral direction form one focus detection area. That is, an area of 80 rows×240 columns=19,200 pixels serves as one focus detection area. One focus detection area is defined as an AF area. One section includes four pixels $S_{HA}$ corresponding to one divided pupil in the lateral direction, and four pixels $S_{HB}$ corresponding to the other divided pupil.

In the second embodiment, outputs from the four pixels $S_{HA}$ are added to obtain one AF pixel of one image signal (called image A) for calculating the phase difference. Similarly, outputs from the four pixels $S_{HB}$ are added to obtain one AF pixel of the other image signal (called image B) for calculating the phase difference.

Figure 25A:
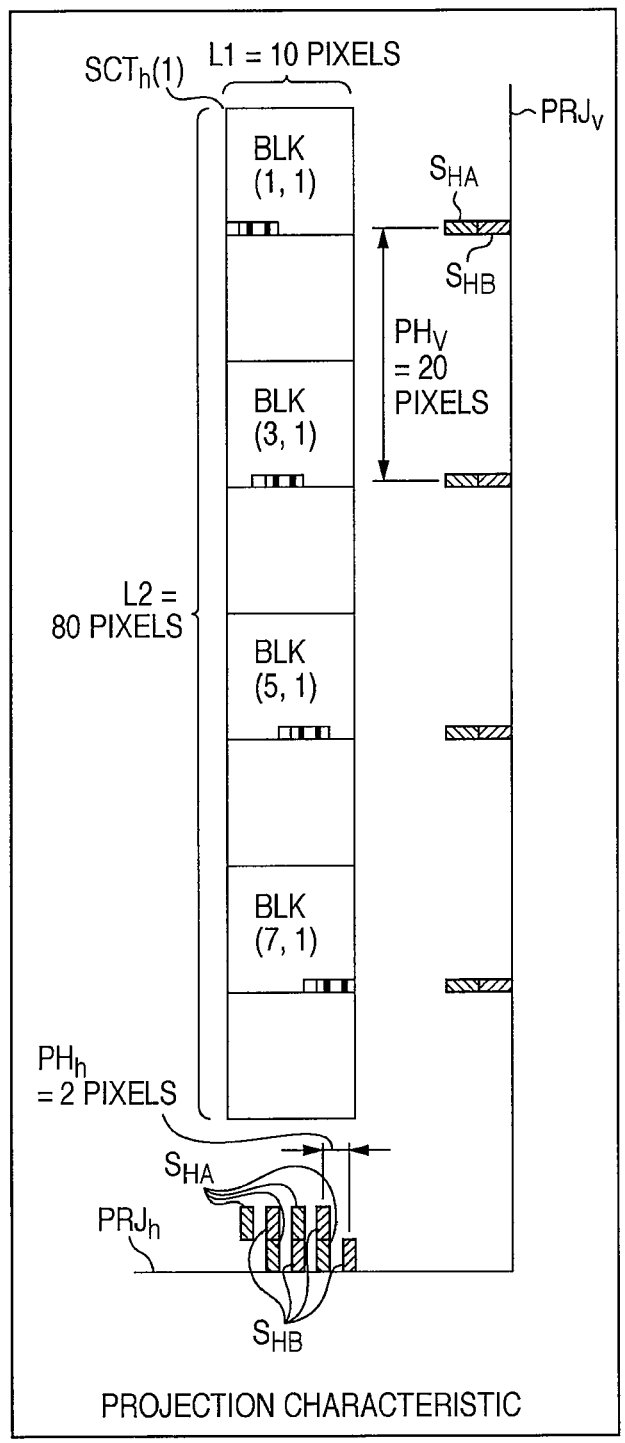
FIGS. 25A and 25B are views for explaining an image sampling characteristic in lateral defocus detection according to the second preferred embodiment of the present invention.
Figure 25B:
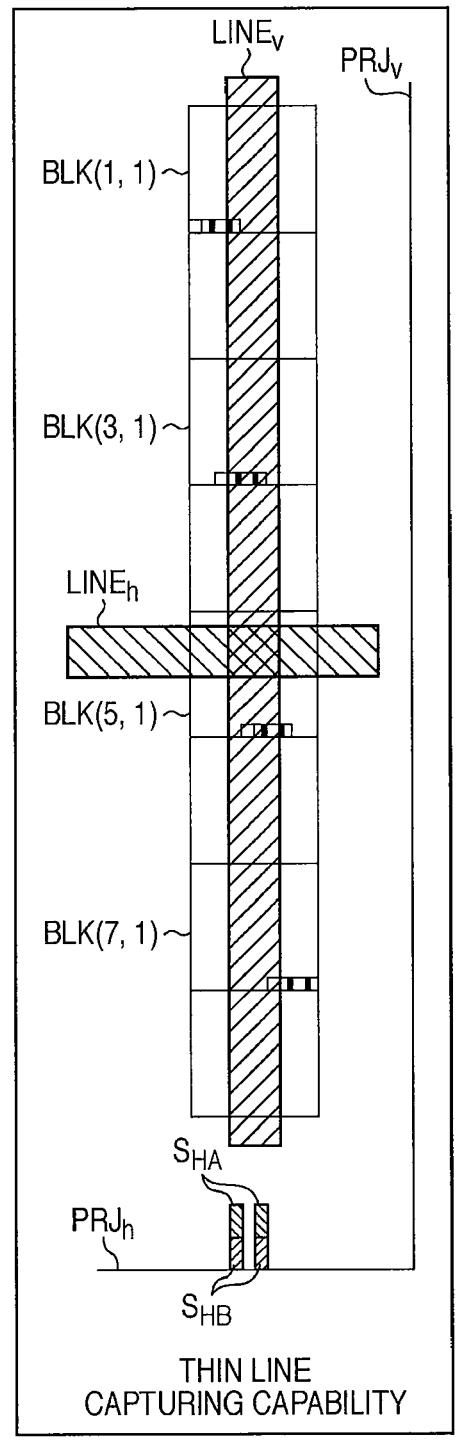

FIGS. 25A and 25B are views for explaining the object image capturing capability of one section, and correspond to FIGS. 13A and 13B in the first embodiment. FIG. 25A shows a leftmost section cut out from FIG. 24. A horizontal line $PRJ_h$ shown at the bottom of FIG. 25A is the first projection line extending in the second direction perpendicular to the pupil division direction (first direction) of the focus detection pixels $S_{HA}$ and $S_{HB}$. A vertical line $PRJ_v$ shown on the right side of FIG. 25A is the second projection line extending in the pupil division direction. Signals from all pixels $S_{HA}$ in one section are added, and those from all pixels $S_{HB}$ are also added. When one section is regarded as one AF pixel, and light receiving portions included in one AF pixel are projected on the projection line $PRJ_h$ in the direction perpendicular to the pupil division direction, this reveals that the pixels $S_{HA}$ and $S_{HB}$ are alternately aligned densely. Letting P1 be the average array pitch of the pixels $S_{HA}$ along the projection line $PRJ_h$ in the direction perpendicular to the pupil division direction, $P1=PH_h=2$ (the unit is a pixel). When the pitch is represented by a spatial frequency F1, F1=0.5 (the unit is a pixel/pixel). Similarly, the array pitch of the pixels $S_{HB}$ along the projection line $PRJ_h$ is P1=2 (the unit is a pixel), and the spatial frequency F1=0.5 (the unit is a pixel/pixel).

When light receiving portions included in one AF pixel are projected on the projection line $PRJ_v$ in the pupil division direction, this reveals that the pixels $S_{HA}$ and $S_{HB}$ are aligned sparsely. Letting P2 be the array pitch of the pixels $S_{HA}$ along the projection line $PRJ_v$, $P2=PH_v=20$ (the unit is a pixel). When the pitch is represented by a spatial frequency F2, F2=0.05 (the unit is a pixel/pixel). Similarly, the array pitch of the pixels $S_{HB}$ along the projection line $PRJ_v$ is P2=20 (the unit is a pixel), and the spatial frequency F2=0.05 (the unit is a pixel/pixel). That is, the object image sampling characteristic of the AF pixel in the second embodiment is almost the same as that in the first embodiment.

The image capturing capability when projecting an object image of a thin line onto the AF pixel (one section) shown in FIG. 25A will be explained with reference to FIG. 25B. In FIG. 25B, $LINE_v$ represents a thin vertical line projected on an image sensor 107, and has a width of four pixels in pixel conversion and 8 μm in the actual size of an image. At this time, focus detection pixels in the blocks BLK(1,1), BLK(3,1), and BLK(5,1) of the section $SCT_h(1)$ capture the object image. Also in the second embodiment, at least one pixel $S_{HA}$ and one pixel $S_{HB}$ capture an image, preventing a capturing failure.

$LINE_h$ in FIG. 25B represents a 4-pixel wide thin horizontal line projected on the image sensor 107. At this time, the horizontal line $LINE_h$ is projected on the block BLK(5,1), but is not captured by the focus detection pixels $S_{HA}$ and $S_{HB}$. However, the section $SCT_h(1)$ is used to detect the focus of an object having a luminance distribution in the lateral direction, like a vertical line. Thus, it does not matter if no focus detection pixel captures the image of an object having a luminance distribution in the longitudinal direction, like a horizontal line.

The characteristics of detecting longitudinal defocus in the second embodiment are equivalent to those obtained by rotating the characteristics in FIGS. 25A and 25B through 90°, and a description thereof will be omitted. The focus detection operation complies with the routines shown in FIGS. 18 to 20.

In the above description, a focus detection pixel is assigned to a B pixel, but may also be assigned to an R pixel. The arrangement of a pair of focus detection pixels is not limited to the second embodiment. For example, in FIG. 21, paired lateral defocus detection pixels are arranged at an interval in the lateral direction, but may also be arranged at an interval in the longitudinal direction.

According to the second embodiment, focus detection pixels are assigned to pixels of a single color, simplifying the defective pixel interpolation algorithm when generating an output image. The degradation and false color of an image in a specific color can be reduced.

Third Embodiment

In the first and second embodiments, two focus detection pixels are paired, one pixel receives a beam having passed through one pupil in the pupil area divided into two, and the other pixel receives a beam having passed through the other pupil. In contrast, the third embodiment will describe an image sensor in which a beam having passed through the pupil area divided into two is received by one pixel to output the signal.

The third embodiment will be described with reference to FIGS. 26 and 27.

Figure 26:
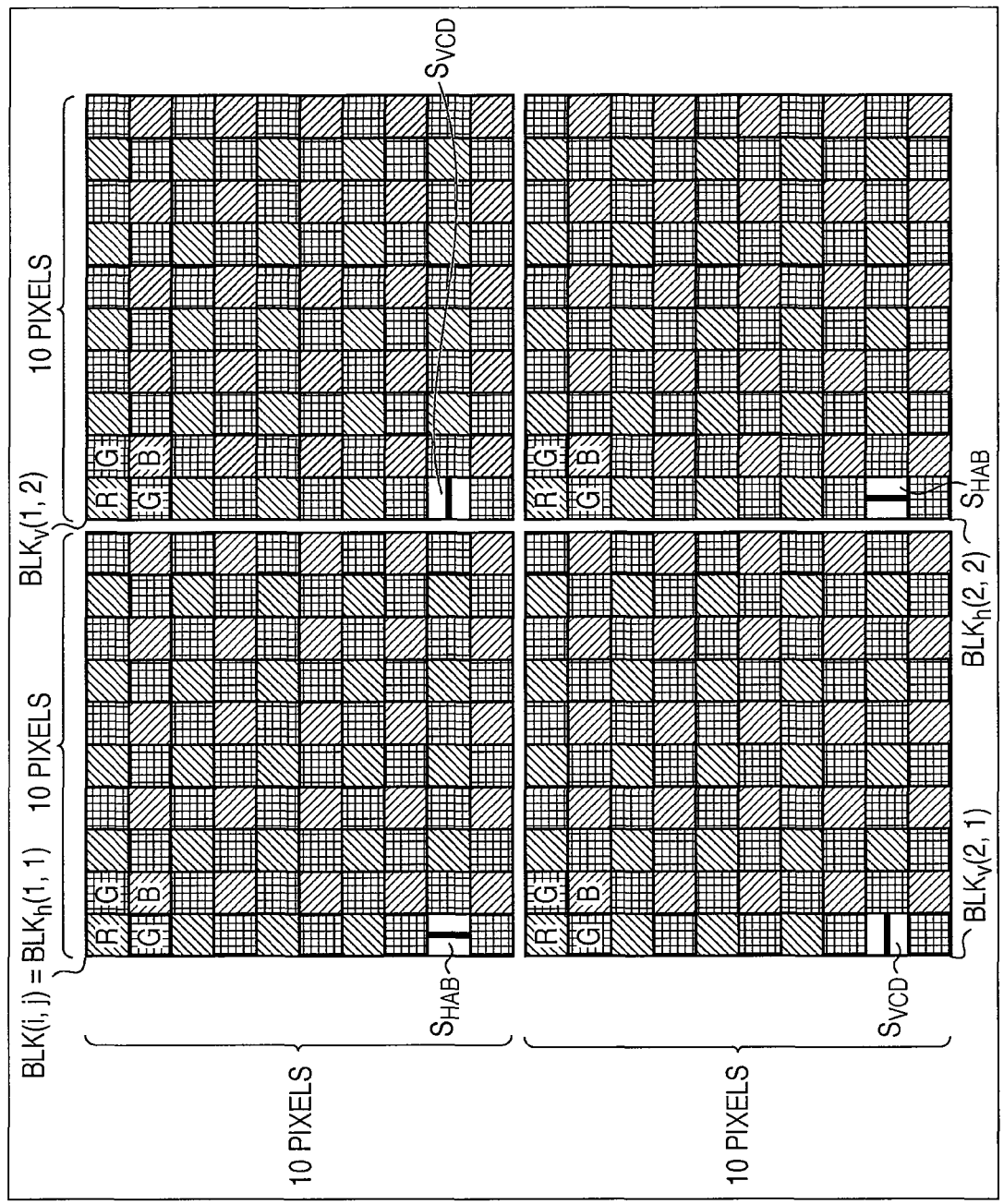
FIG. 26 is a view for explaining a pixel array of an image sensor for a minimum unit according to the third preferred embodiment of the present invention.

FIG. 26 is a view showing a focus detection pixel array according to the third embodiment, and corresponds to FIG. 9 in the first embodiment. In the first embodiment shown in FIG. 9, the focus detection pixels $S_{HA}$, $S_{HB}$, $S_{VC}$ and $S_{VD}$ are assigned to the positions of R and B pixels diagonally adjacent to each other among image sensing pixels having the Bayer array. In the third embodiment shown in FIG. 26, a focus detection pixel is assigned to only one R pixel in each block of 10×10=100 pixels. More specifically, in each of the top left block $BLK_h(1,1)$ and lower right block $BLK_h(2,2)$, one R pixel near the bottom on the leftmost column is replaced with one focus detection pixel $S_{HAB}$ for dividing the pupil in the horizontal direction. The focus detection pixel $S_{HAB}$ can be formed by a technique disclosed in Japanese Patent Laid-Open No. 2003-156677 filed by the present applicant. More specifically, a photoelectric conversion element behind an on-chip microlens is divided to divide the pupil of a photographing optical system. A beam having passed through each divided pupil area is independently received and output as an image signal. Hence, one pixel can output a pair of signals for detecting the phase difference.

In each of the remaining blocks $BLK_v(1,2)$ and $BLK_v(2,1)$, one R pixel near the bottom on the leftmost column is replaced with one focus detection pixel $S_{VCD}$ for dividing the pupil in the vertical direction.

This arrangement rule is generalized to arrange a focus detection pixel for horizontal pupil division in a block BLK (i,j) when i+j is an even number, and a focus detection pixel for vertical pupil division in it when i+j is an odd number, similar to the first embodiment. An area of 2×2=4 blocks, i.e., 20 rows×20 columns=400 pixels is defined as a cluster.

Figure 27:
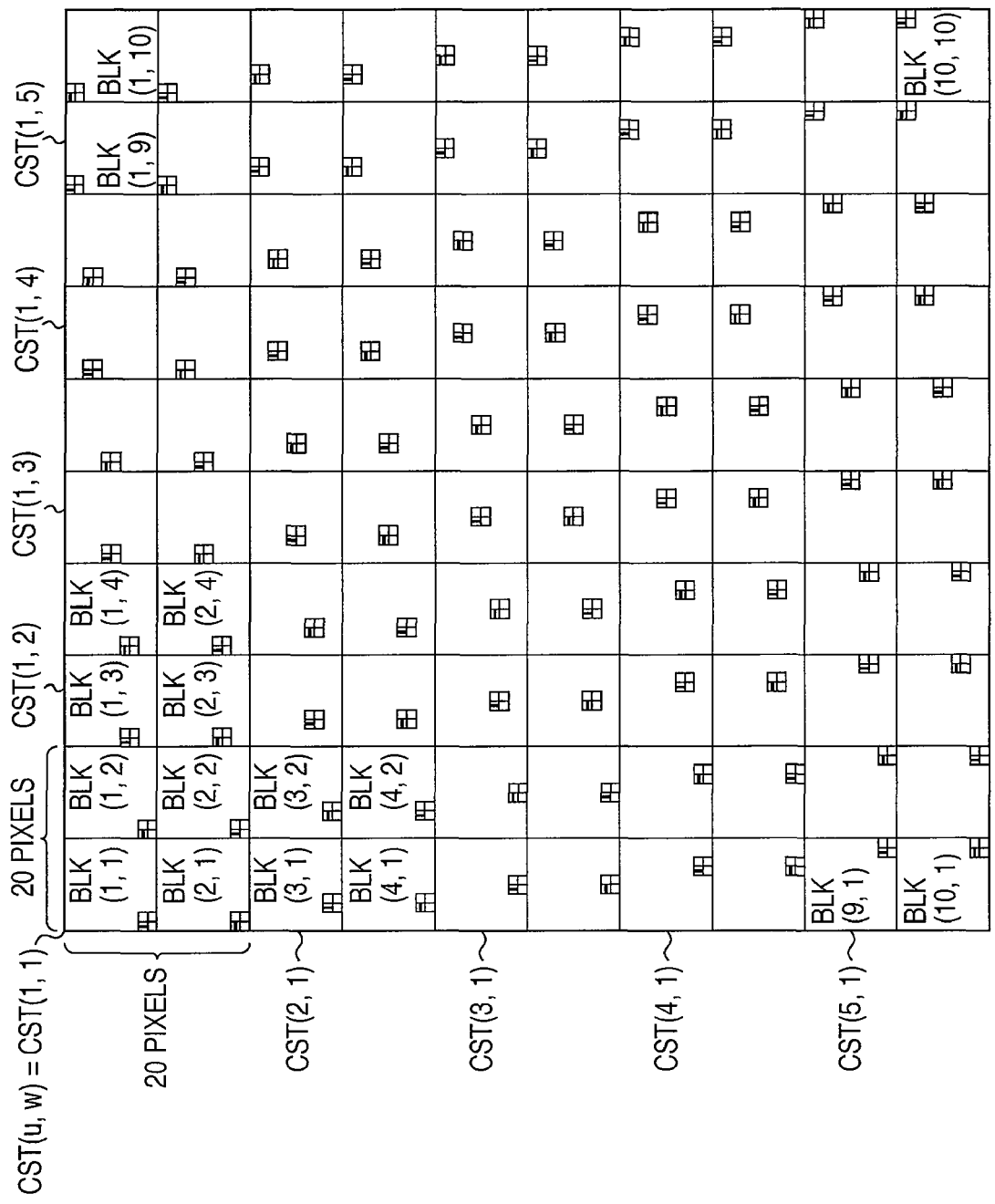
FIG. 27 is a view for explaining a pixel array of the image sensor for a superordinate unit according to the third preferred embodiment of the present invention.

FIG. 27 is a view for explaining a rule to arrange a set of clusters each serving as a unit, and corresponds to FIG. 10 in the first embodiment. The entire area shown in FIG. 27 represents one field superordinate to the cluster. The arrangement rule of the field is the same as that in the first embodiment.

The field arrangement in the entire image sensing area, the focus detection characteristic, and the focus detection routine in the third embodiment are the same as those shown in FIGS. 11 to 20 in the first embodiment, and a description thereof will be omitted.

According to the third embodiment, the number of pixels assigned to focus detection pixels decreases, further reducing the degradation and false color of an output image. The third embodiment simplifies even the defective pixel interpolation algorithm when generating an output image.

Fourth Embodiment

In the first to third embodiments, lateral defocus detection pixels and longitudinal defocus detection pixels are arranged at equal densities. In the fourth embodiment, however, pixels of only either type are arranged. The arrangement of the fourth embodiment will be explained with reference to FIGS. 28 to 30.

Figure 28:
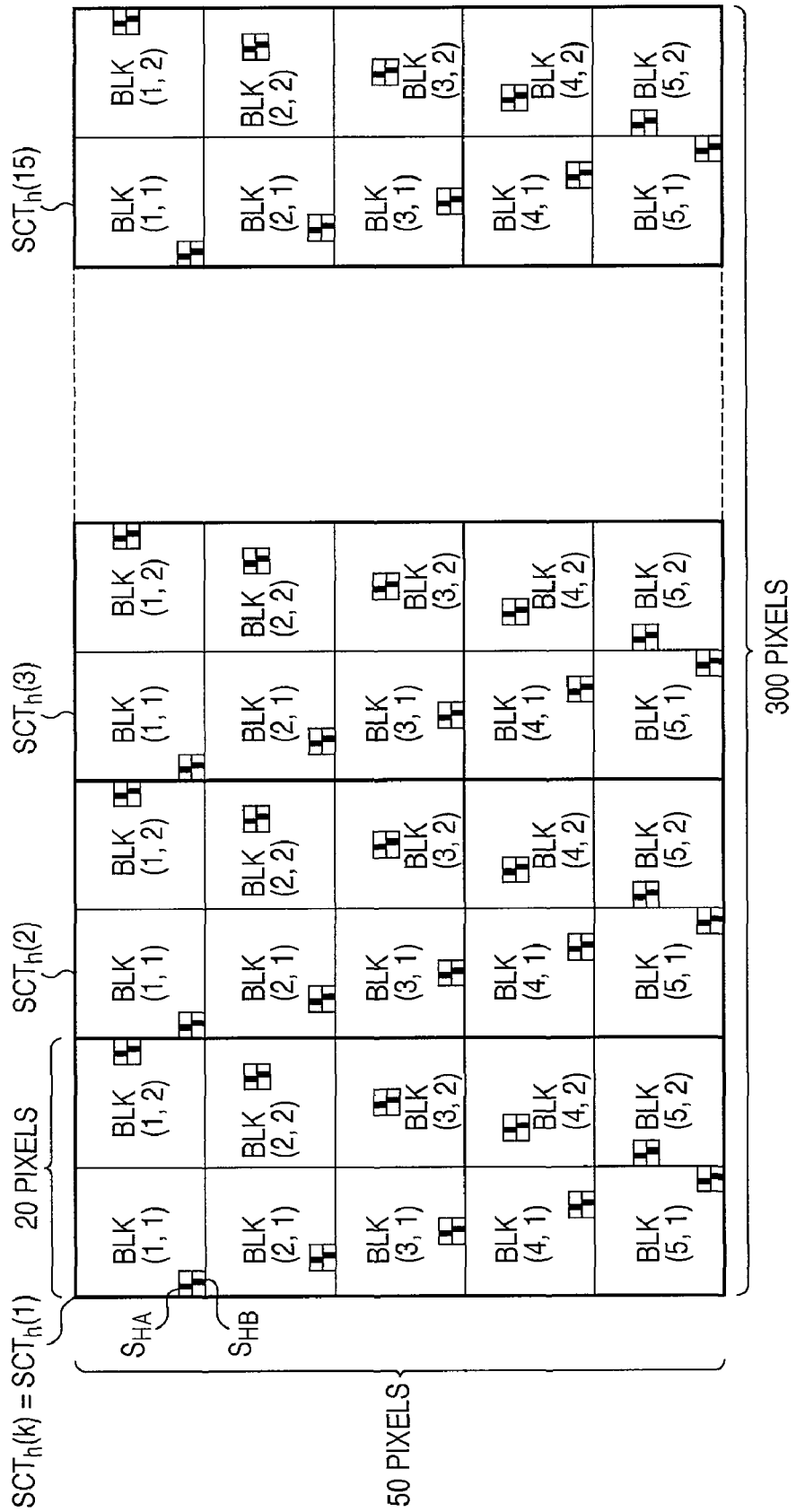
FIG. 28 is a view for explaining a pixel grouping method in focus detection according to the fourth preferred embodiment of the present invention.

FIG. 28 is a view showing a focus detection pixel array according to the fourth embodiment, and corresponds to FIG. 12 in the first embodiment. In the fourth embodiment, a block serving as the minimum unit of the pixel array is made up of 10 rows×10 columns=100 pixels, similar to the first embodiment. However, focus detection pixels in the fourth embodiment are only pixels shown in FIG. 6A, i.e., pixels $S_{HA}$ and $S_{HB}$ for dividing the pupil of the photographing optical system in the horizontal direction. One section for focus detection is made up of 2×5=10 blocks, i.e., 50 rows×20 columns=1,000 pixels. In each section, focus detection pixel pairs are arrayed in a V shape, as shown in FIG. 28. Note that the vertical arrangement position of a focus detection pixel pair in each block BLK(i,j) is different between blocks whose "j" is an odd number and blocks whose "j" is an even number.

Figure 29A:
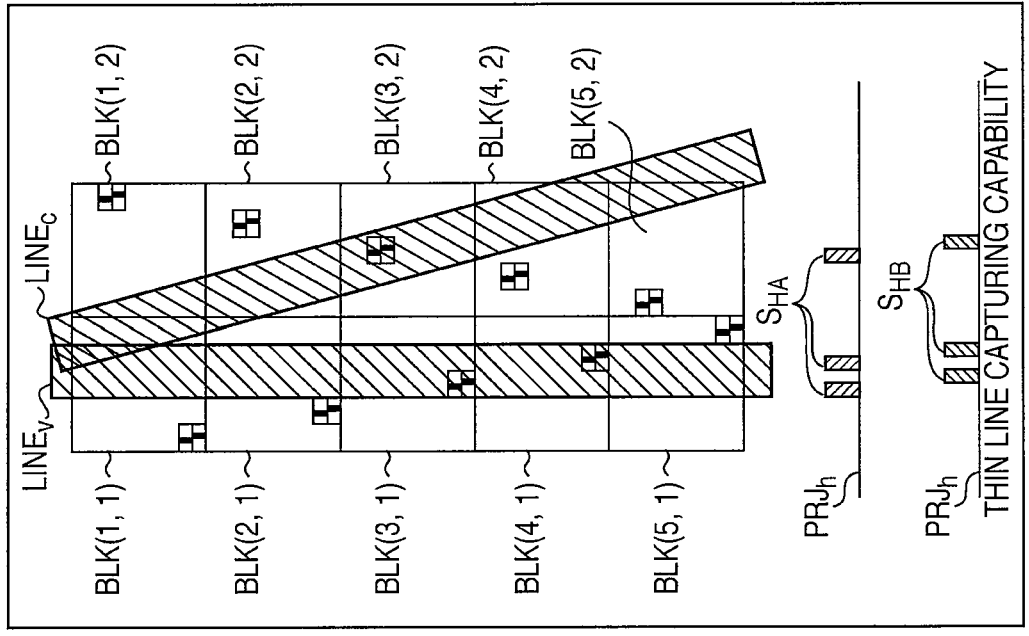
FIGS. 29A and 29B are views for explaining an image sampling characteristic in focus detection according to the fourth preferred embodiment of the present invention.
Figure 29B:
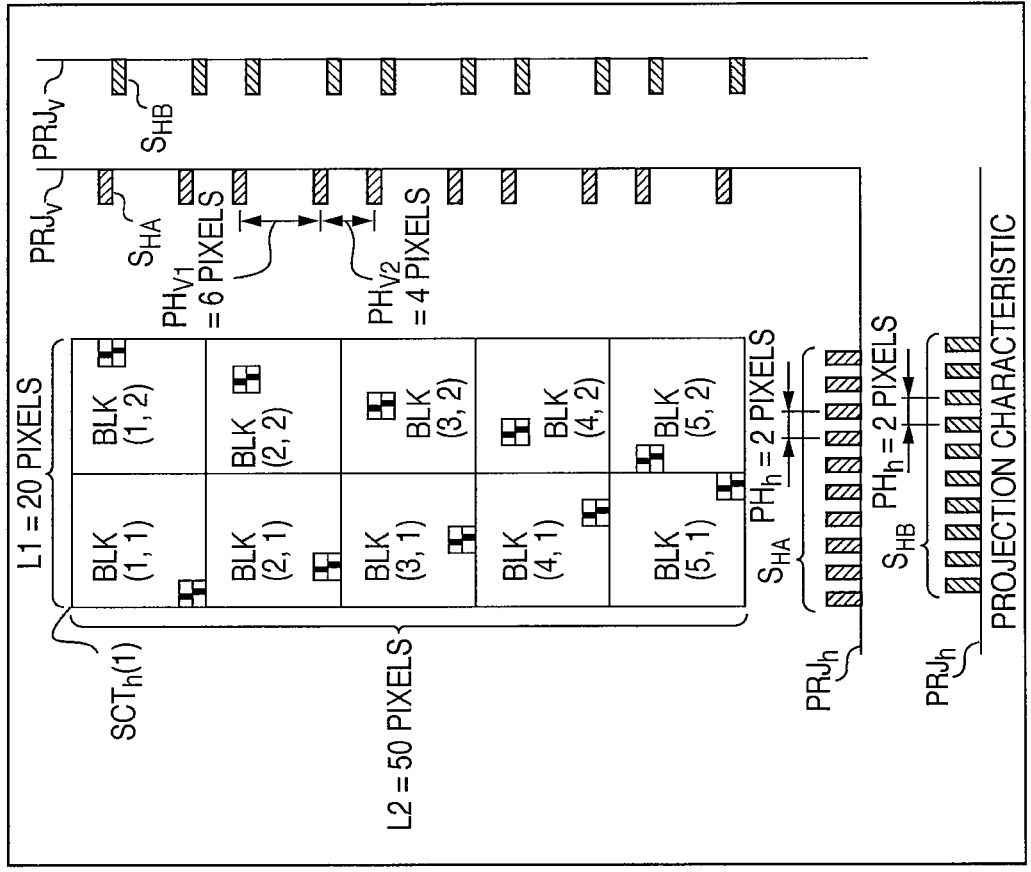

FIGS. 29A and 29B are views for explaining the object image capturing capability of one section, and correspond to FIGS. 13A and 13B in the first embodiment. FIG. 29A shows a leftmost section cut out from FIG. 28. A horizontal line $PRJ_h$ shown at the bottom of FIG. 29A is the first projection line extending in the second direction perpendicular to the pupil division direction (first direction) of the focus detection pixels $S_{HA}$ and $S_{HB}$. A vertical line $PRJ_v$ shown on the right side of FIG. 29A is the second projection line extending in the pupil division direction. Also in the fourth embodiment, outputs from all pixels $S_{HA}$ in one section are added, and those from all pixels $S_{HB}$ are also added. When one section is regarded as one AF pixel, and light receiving portions included in one AF pixel are projected on the projection line $PRJ_h$ in the direction perpendicular to the pupil division direction, this reveals that the pixels $S_{HA}$ and $S_{HB}$ are alternately aligned densely. Letting P1 be the array pitch of the pixels $S_{HA}$ along the projection line $PRJ_h$ in the direction perpendicular to the pupil division direction, $P1=PH_h=2$ (the unit is a pixel). When the pitch is represented by a spatial frequency F1, $F1=0.5$ (the unit is a pixel/pixel). Similarly, the array pitch of the pixels $S_{HB}$ along the projection line $PRJ_h$ is $P1=2$ (the unit is a pixel), and the spatial frequency $F1=0.5$ (the unit is a pixel/pixel).

In contrast, when light receiving portions included in one AF pixel are projected on the projection line $PRJ_v$ in the pupil division direction, this reveals that the pixels $S_{HA}$ and $S_{HB}$ are aligned sparsely at different intervals. The array pitch of the pixels $S_{HA}$ along the projection line $PRJ_v$ takes two values. The larger pitch is $PH_{v1}=6$, the smaller pitch is $PH_{v2}=4$, and the average is $P2=5$ (the unit of these pitches is a pixel). Similarly, the average array pitch of the pixels $S_{HB}$ along the projection line $PRJ_v$ is $P2=5$ (the unit is a pixel), and the average spatial frequency $F2=0.2$ (the unit is a pixel/pixel).

That is, as for the distribution characteristic before grouping, the AF pixel in the fourth embodiment has different arrangement characteristics in the pupil division direction and the direction perpendicular to it. However, the group shape in grouping is designed into a rectangle, attaining a desired sampling characteristic. More specifically, the maximum size L1 of one section in the direction perpendicular to the pupil division direction is 20 pixels, and the maximum size L2 in the pupil division direction is 50 pixels. By setting the section sizes to L1<L2, the sampling frequency F1 in the direction perpendicular to the pupil division direction is set high (dense), and the sampling frequency F2 in the pupil division direction is set low (sparse).

The image capturing capability when projecting an object image of a thin line onto the AF pixel (one section) shown in FIG. 29A will be explained with reference to FIG. 29B. In FIG. 29B, $LINE_v$ represents a thin vertical line projected on an image sensor 107, and has a width of four pixels in pixel conversion and 8 μm in the actual size of an image. At this time, focus detection pixels in the blocks BLK(3,1) and BLK(4,1) of the section $SCT_h(1)$ capture the object image.

$LINE_C$ in FIG. 29B represents an inclined vertical line obtained by rotating the vertical line $LINE_v$ counterclockwise through 15°. This inclined vertical line is captured by focus detection pixels in the block BLK(3,2). Since no longitudinal defocus detection pixel is adopted in the fourth embodiment, the focus for a horizontal line cannot be detected.

Figure 30:
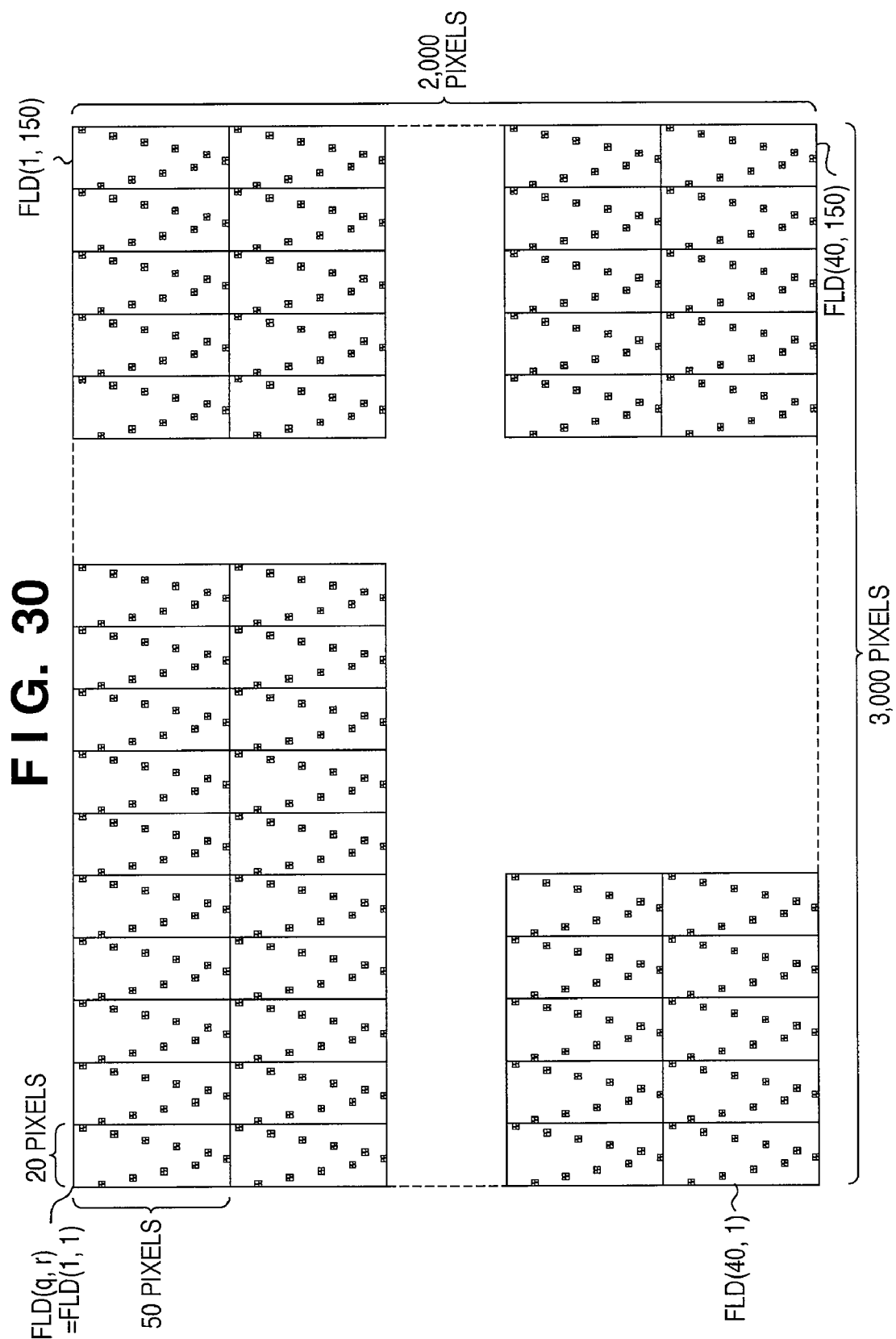
FIG. 30 is a view for explaining a pixel array in the entire area of an image sensor according to the fourth preferred embodiment of the present invention.

FIG. 30 is a view of a pixel arrangement in the entire area of the image sensor 107, and corresponds to FIG. 11 in the first embodiment. In the fourth embodiment, the section shown in FIG. 28 also corresponds to a field, and the image sensing area is made up of 40×150=6,000 fields, as shown in FIG. 30. The lateral defocus can be detected in the entire image sensing area.

The fourth embodiment can simplify the focus detection pixel arrangement rule, save the memory area for storing the arrangement rule, and manufacture the apparatus at low cost. Further, the fourth embodiment can simplify the algorithm for interpolating a defective pixel, increase the image processing speed, and achieve quick focus adjustment for shooting.

The first to fourth embodiments have exemplified a digital still camera, but the present invention is not limited to this. The image capturing apparatus according to the present invention is applicable not only to the digital still camera, but also to a camcorder (movie camera) for recording a moving image, various inspection cameras, a monitoring camera, an endoscope camera, a robot camera, and the like. In the first to fourth embodiments described above, composition includes addition and averaging.

It should be noted that the arrangement of the components and the numerical values set forth in the first to fourth embodiments are merely examples, and do not limit the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-163019, filed Jun. 20, 2007, which is hereby incorporated by reference herein in its entirety.

What is claimed is:
1. An image capturing apparatus comprising:
   an image sensor in which a plurality of focus detection portions each of which is pupil-divided into a first focus detection pixel and a second focus detection pixel along a first direction are arranged along a second direction perpendicular to the first direction in each of a plurality of sections;

a composition unit which composites signals output from the first focus detection pixels to obtain a first composite signal, and composites signals output from the second focus detection pixels to obtain a second composite signal in each of the plurality of sections;

a coupling unit which couples first composite signals each of which is composited in each of the plurality of sections to obtain a first coupled signal, and couples second composite signals each of which is composited in each of the plurality of sections to obtain a second coupled signal; and an arithmetic unit which calculates a defocus amount of an image forming optical system on the basis of the first coupled signal and the second coupled signal.

2. The apparatus according to claim 1, wherein the image sensor has a plurality of image sensing pixels for photoelectrically converting an object image formed by the image forming optical system.

3. The apparatus according to claim 1, wherein an interval between the first focus detection pixels in the first direction is smaller than an interval between the first focus detection pixels in the second direction in at least one section of the plurality of sections.

4. The apparatus according to claim 3, wherein a maximum size of the at least one section in the first direction is smaller than a maximum size of the at least one section in the second direction.

5. The apparatus according to claim 3, wherein
an interval between the second focus detection pixels in the first direction is smaller than an interval between the second focus detection pixels in the second direction in at least one section of the plurality of sections.

6. The apparatus according to claim 1, wherein
at least one section of the plurality of sections is formed from a plurality of square areas, and
one first focus detection pixel is arranged in each of the plurality of square areas.

7. A method of controlling an image capturing apparatus having an image sensor in which a plurality of focus detection portions each of which is pupil-divided into a first focus detection pixel and a second focus detection pixel along a first direction are arranged along a second direction perpendicular to the first direction in each of a plurality of sections, the method comprising steps of:

compositing signals output from the first focus detection pixels to obtain a first composite signal in each of the plurality of sections;

compositing signals output from the second focus detection pixels to obtain a second composite signal in each of the plurality of sections;

coupling first composite signals each of which is composited in each of the plurality of sections to obtain a first coupled signal;

coupling second composite signals each of which is composited in each of the plurality of sections to obtain a second coupled signal; and calculating a defocus amount of an image forming optical system on the basis of the first coupled signal and the second coupled signal.

* * * * *